(12) United States Patent
Lee et al.

(10) Patent No.: US 12,302,402 B2
(45) Date of Patent: May 13, 2025

(54) METHOD FOR TRANSMITTING AND RECEIVING SIGNAL FOR TERMINAL TO PERFORM RANDOM ACCESS CHANNEL PROCEDURE IN UNLICENSED BAND, AND APPARATUS THEREFOR

(71) Applicant: LG Electronics Inc., Seoul (KR)

(72) Inventors: Jeongsu Lee, Seoul (KR); Sukhyon Yoon, Seoul (KR); Hyunsoo Ko, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/641,998

(22) PCT Filed: May 20, 2020

(86) PCT No.: PCT/KR2020/006587
§ 371 (c)(1),
(2) Date: Mar. 10, 2022

(87) PCT Pub. No.: WO2021/066278
PCT Pub. Date: Apr. 8, 2021

(65) Prior Publication Data
US 2024/0049287 A1  Feb. 8, 2024

(30) Foreign Application Priority Data

Oct. 4, 2019 (KR) .......... 10-2019-0123141

(51) Int. Cl.
*H04W 74/0833* (2024.01)
*H04W 74/00* (2009.01)

(52) U.S. Cl.
CPC ..... *H04W 74/0833* (2013.01); *H04W 74/004* (2013.01)

(58) Field of Classification Search
None
See application file for complete search history.

(56) References Cited

U.S. PATENT DOCUMENTS

2019/0053272 A1  2/2019  Tsai
2020/0107372 A1*  4/2020  Agiwal ............ H04W 24/08
(Continued)

OTHER PUBLICATIONS

CMCC, "Discussion on Channel Structure for 2-step RACH," R1-1908860, Presented at 3GPP TSG RAN WG1 #98, Prague, CZ, Aug. 26-30, 2019, 6 pages.
(Continued)

*Primary Examiner* — Diane L Lo
(74) *Attorney, Agent, or Firm* — Fish & Richardson P.C.

(57) ABSTRACT

Disclosed is a method for transmitting and receiving a signal for a terminal to perform a random access channel procedure (RACH Procedure) in an unlicensed band. In particular, the method comprises: receiving a synchronization signal/physical broadcast channel block (SS/PBCH block); obtaining system information from a PBCH included in the SS/PBCH block; sending a first physical random access channel (PRACH) preamble through a message A on the basis of the system information; and receiving a random access response (RAR) through a message B related to contention resolution in response to the message A, wherein the first PRACH preamble is a PRACH preamble mapped to a physical uplink shared channel (PUSCH) occasion for the message A, and a window for reception of the message B may start after at least one symbol from the last symbol of the PUSCH occasion.

9 Claims, 25 Drawing Sheets

(56) References Cited

U.S. PATENT DOCUMENTS

2020/0374928 A1* 11/2020 Xiong ............... H04W 74/0833
2020/0404713 A1* 12/2020 Sakhnini ........... H04W 74/0833
2021/0058971 A1*  2/2021 MolavianJazi ....... H04L 5/0044
2021/0100038 A1*  4/2021 Ly ............................ H04L 5/14

OTHER PUBLICATIONS

Qualcomm Incorporated, "Procedures for Two-Step RACH," R1-1909240, Presented at 3GPP TSG-RAN WG1 Meeting #98, Prague, Czech Republic, Aug. 26-30, 2019, 15 pages.
Spreadtrum communications, "Discussion on 2-step RACH procedure," R1-1908967, Presented at 3GPP TSG RAN WG1 Meeting #98, Prague, Czech Republic, Aug. 26-30, 2019, 6 pages.
Vivo, "Discussion on 2-step RACH procedure," R1-1908135, Presented at 3GPP TSG RAN WG1 #98, Prague, CZ, Aug. 26-30, 2019, 5 pages.

* cited by examiner (A) CONTROL-PLANE PROTOCOL STACK (B) USER-PLANE PROTOCOL STACK (a) Carrier aggregation between L-band and U-band (b) Standalone U-band(s)

METHOD FOR TRANSMITTING AND RECEIVING SIGNAL FOR TERMINAL TO PERFORM RANDOM ACCESS CHANNEL PROCEDURE IN UNLICENSED BAND, AND APPARATUS THEREFOR

CROSS-REFERENCE TO RELATED APPLICATIONS

This application is a National Stage application under 35 U.S.C. § 371 of International Application No. PCT/KR2020/006587, filed on May 20, 2020, which claims the benefit of Korean Application No. 10-2019-0123141, filed on Oct. 4, 2019. The disclosures of the prior applications are incorporated by reference in their entirety.

TECHNICAL FIELD

The present disclosure relates to a method and an apparatus for transmitting and receiving a signal for a terminal to perform a random access process in an unlicensed band, and more particularly, relates to a method for transmitting and receiving a signal for a terminal to perform a two-step random access procedure in a wireless communication system and an apparatus therefor.

BACKGROUND

As more and more communication devices require greater communication capacity, there is a need for improved mobile broadband communication compared to a conventional radio access technology (RAT). In addition, massive MTC (Machine Type Communications), which provides various services anytime and anywhere by connecting multiple devices and things, is also one of the major issues to be considered in next-generation communication. In addition, a communication system design considering a service sensitive to reliability and latency is under discussion. As such, the introduction of the next-generation RAT in consideration of enhanced mobile broadband communication (eMBB), massive MTC (mMTC), and ultra-reliable and low latency communication (URLLC) is being discussed, and in the present disclosure, the corresponding technology is referred to as New RAT.

DISCLOSURE

Technical Problem

An object of the present disclosure is to provide a method for transmitting and receiving a signal for performing a two-step random access procedure and an apparatus therefor.

The technical objects to be achieved in the present disclosure are not limited to the technical objects mentioned above, and those of ordinary skill in the art to which the present disclosure belongs may clearly understand other technical objects not mentioned from the description below.

Technical Solution

According to an embodiment of the present disclosure, a method of transmitting and receiving signals for performing a random access channel (RACH) procedure by a terminal in an unlicensed band may comprise, receiving a synchronization signal/physical broadcast channel (SS/PBCH) block from a base station, obtaining system information from the PBCH included in the SS/PBCH block, transmitting a first physical random access channel (PRACH) preamble through a message A to the base station, based on the system information, and receiving a random access response (RAR) through a message B related to a contention resolution from the base station, in response to the message A, wherein the first PRACH preamble may be a PRACH preamble mapped to a physical uplink shared channel (PUSCH) occasion for the message A, wherein a window for receiving the message B may start at least one symbol after a last symbol of the PUSCH occasion.

Here, the first PRACH preamble and a first PUSCH based on the PUSCH occasion may be transmitted through the message A.

In addition, the RAR may be a success RAR including information on the contention resolution.

In addition, only the first PRACH preamble may be transmitted through the message A.

In addition, the RAR may be a fallback RAR including uplink (UL) grant information.

In addition, the window may start at a first symbol of a resource related to monitoring of the message B.

In addition, the PUSCH occasion may be a valid PUSCH occasion related to a RACH occasion for the first PRACH preamble.

According to the present disclosure, a device for transmitting and receiving signals for performing a random access channel (RACH) procedure in an unlicensed band may comprise, at least one processor; and at least one memory operably connected to the at least one processor, and storing instructions that, based on being executed by the at least one processor, perform specific operations wherein the specific operations may comprise, receiving a synchronization signal/physical broadcast channel (SS/PBCH) block, obtaining system information from the PBCH included in the SS/PBCH block, transmitting a first physical random access channel (PRACH) preamble through a message A, based on the system information, and receiving a random access response (RAR) through a message B related to a contention resolution, in response to the message A, wherein the first PRACH preamble may be a PRACH preamble mapped to a physical uplink shared channel (PUSCH) occasion for the message A, and wherein a window for receiving the message B may start at least one symbol after a last symbol of the PUSCH occasion.

Here, the first PRACH preamble and a first PUSCH based on the PUSCH occasion may be transmitted through the message A.

In addition, the RAR may be a success RAR including information on the contention resolution.

In addition, only the first PRACH preamble may be transmitted through the message A.

In addition, the RAR may be a fallback RAR including uplink (UL) grant information.

In addition, the window may start at a first symbol of a resource related to monitoring of the message B.

In addition, the PUSCH occasion may be a valid PUSCH occasion related to a RACH occasion for the first PRACH preamble.

According to the present disclosure, a terminal for transmitting and receiving signals for performing a random access channel (RACH) procedure in an unlicensed band may comprise, at least one transceiver; at least one processor; and at least one memory operably connected to the at least one processor, and storing instructions that, based on being executed by the at least one processor, perform specific operations, wherein the specific operations may comprise, receiving a synchronization signal/physical broadcast channel (SS/PBCH) block from a base station, obtaining system information from the PBCH included in the SS/PBCH block, transmitting a first physical random access channel (PRACH) preamble through a message A to the base station, based on the system information, and receiving a random access response (RAR) through a message B related to a contention resolution from the base station, in response to the message A, wherein the first PRACH preamble may be a PRACH preamble mapped to a physical uplink shared channel (PUSCH) occasion for the message A, wherein a window for receiving the message B may start at least one symbol after a last symbol of the PUSCH occasion.

Technical Effects

According to the present disclosure, a terminal may easily transmit and receive a signal for performing a two-step random access procedure in an unlicensed band.

The effects that may be obtained from the present disclosure are not limited to the above-mentioned effects, and those of ordinary skill in the art to which the present disclosure belongs may clearly understand other effects not mentioned from the description below.

BEST MODE

Figure 1:
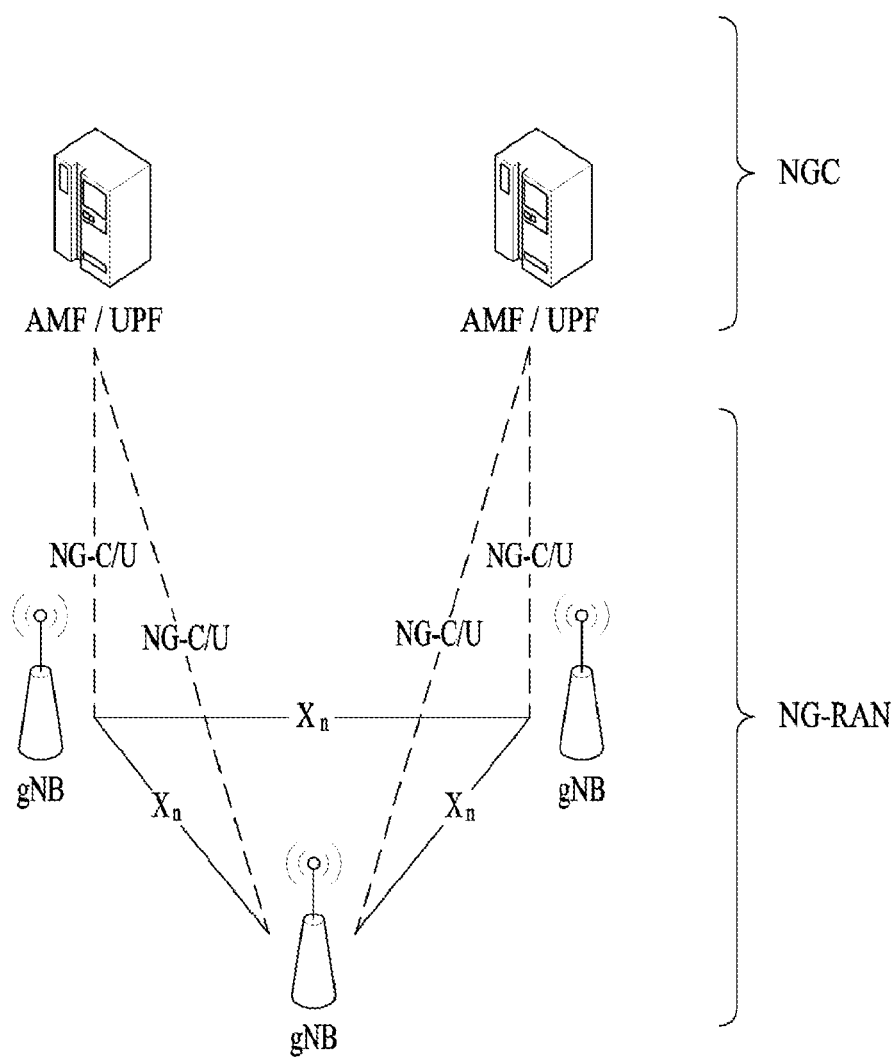
FIG. 1 is a diagram illustrating an example of an NR system network architecture.

The constitutions, operations and other features of the present disclosure may be easily understood by the embodiments of the present disclosure described below with reference to the accompanying drawings. The embodiments described below are examples in which the technical features of the present disclosure are applied to a 3GPP system.

Although the present disclosure describes embodiments of the present disclosure using LTE system, LTE-A system, and NR system, these are mere examples, and the embodiment of the present disclosure may be applied to any communication system falling under the above definition.

In addition, in the present disclosure, the name of the base station may be used as a generic term including a remote radio head (RRH), an eNB, a transmission point (TP), a reception point (RP), a relay, etc.

The 3GPP-based communication standard defines downlink physical channels corresponding to resource elements carrying information originated from a higher layer, and downlink physical signals corresponding to resource elements used by the physical layer but not carrying information originated from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as downlink physical channels, and reference signals and synchronization signals are defined as downlink physical signals. A reference signal (RS), also referred to as a pilot, refers to a signal of a predefined special waveform that the gNB and the UE know each other, for example, cell specific RS (RS), UE-specific RS (UE-RS), a positioning RS (PRS), and a channel state information RS (CSI-RS) are defined as downlink reference signals. The 3GPP LTE/LTE-A standard defines uplink physical channels corresponding to resource elements carrying information originated from a higher layer, and uplink physical signals corresponding to resource elements used by the physical layer but not carrying information originated from a higher layer. For example, a physical uplink shared channel (PUSCH), a physical uplink control channel (PUCCH), and a physical random access channel (PRACH) are defined as uplink physical channels, and a demodulation reference signal (DMRS) for an uplink control/data signal and a sounding reference signal (SRS) used for uplink channel measurement are defined.

In the present disclosure, PDCCH (Physical Downlink Control CHannel)/PCFICH (Physical Control Format Indicator CHannel)/PHICH ((Physical Hybrid automatic retransmit request Indicator CHannel)/PDSCH (Physical Downlink Shared CHannel) is a set of time-frequency resources or a set of resource elements carrying DCI (Downlink Control Information)/CFI (Control Format Indicator)/

Downlink ACK/NACK (ACKnowlegement/Negative ACK)/downlink data, respectrively. Also, PUCCH (Physical Uplink Control CHannel)/Physical Uplink Shared CHannel (PUSCH)/Physical Random Access CHannel (PRACH) means a set of time-frequency resources or a set of resource elements carrying uplink control information (UCI)/uplink data/random access signals, respectively. In particular, time-frequency resource or resource element (RE) allocated to or belonging to PDCCH/PCFICH/PHICH/PDSCH/PUCCH/PUSCH/PRACH is respectively referred to as PDCCH/PCFICH/PHICH/PDSCH/PUCCH/PUSCH/PRACH RE or PDCCH/PCFICH/PHICH/PDSCH/PUCCH/PUSCH/PRACH resource. Hereinafter, the expression that a user equipment transmits PUCCH/PUSCH/PRACH, respectively, is used in the same meaning as transmitting uplink control information/uplink data/random access signal on or through the PUSCH/PUCCH/PRACH. In addition, the expression that gNB transmits PDCCH/PCFICH/PHICH/PDSCH, respectively, is used in the same meaning as transmitting downlink data/control information on or through PDCCH/PCFICH/PHICH/PDSCH.

In the following, OFDM symbol/subcarrier/RE to which CRS/DMRS/CSI-RS/SRS/UE-RS is assigned or configured is referred to as CRS/DMRS/CSI-RS/SRS/UE-RS symbol/carrier/subcarrier/RE. For example, an OFDM symbol to which a tracking RS (TRS) is allocated or configured is referred to as a TRS symbol, and a subcarrier to which TRS is allocated or configured is referred to as a TRS subcarrier, and an RE to which TRS is allocated or configured is referred to as a TRS RE. In addition, a subframe configured for TRS transmission is referred to as a TRS subframe. Also, a subframe in which a broadcast signal is transmitted is referred to as a broadcast subframe or a PBCH subframe, and a subframe in which a synchronization signal (e.g., PSS and/or SSS) is transmitted is referred to as a synchronization signal subframe or PSS/SSS subframe. An OFDM symbol/subcarrier/RE to which PSS/SSS is allocated or configured is referred to as a PSS/SSS symbol/subcarrier/RE, respectively.

In the present disclosure, CRS port, UE-RS port, CSI-RS port, and TRS port, respectively, means an antenna port configured to transmit CRS, an antenna port configured to transmit UE-RS, an antenna port configured to transmit CSI-RS, and an antenna port configured to transmit TRS. Antenna ports configured to transmit CRSs may be distinguished from each other by positions of REs occupied by CRSs according to CRS ports, and antenna ports configured to transmit UE-RSs may be distinguished from each other by positions of REs occupied by the UE-RSs according to UE-RS ports, and antenna ports configured to transmit CSI-RSs may be distinguished from each other by positions of REs occupied by the CSI-RSs according to CSI-RS ports. Therefore, the term CRS/UE-RS/CSI-RS/TRS port is also used as a term meaning a pattern of REs occupied by CRS/UE-RS/CSI-RS/TRS within a certain resource region.

FIG. 1 is a diagram illustrating an example of an NR system network architecture.

Network of the NR system is largely composed of a next generation radio access network (NG-RAN) and a next generation core (NGC) network. NGC is also referred to as SGC.

Referring to FIG. 1, NG-RAN consists of gNBs that provide ends of user plane protocols (e.g., SDAP, PDCP, RLC, MAC, PHY) and control plane protocols (e.g., RRC, PDCP, RLC, MAC, PHY) for UE. The gNBs are interconnected via an Xn interface. The gNB is connected to the NGC through the NG interface. For example, the gNB is connected to a core network node having an Access and Mobility Management function (AMF) through the N2 interface, which is one of the interfaces between the gNB and the NGC, and is connected a core network node having a user plane function (UPF) through N3 interface which to another one of the interfaces between the gNB and the NGC. AMF and UPF may be implemented by different core network devices, respectively, or may be implemented by one core network device. In the RAN, the transmission/reception of signals between the BS and the UE is performed through an air interface. For example, in the RAN, transmission/reception of a signal between the BS and the UE is performed through a physical resource (e.g., radio frequency (RF)). In contrast, in the core network, the transmission/reception of signals between the gNB and network functions (e.g., AMF, UPF) may be performed, not through a wireless interface, but through a physical connection (e.g., optical cable) between core network nodes or a logical connection between core network functions.

Figure 2:
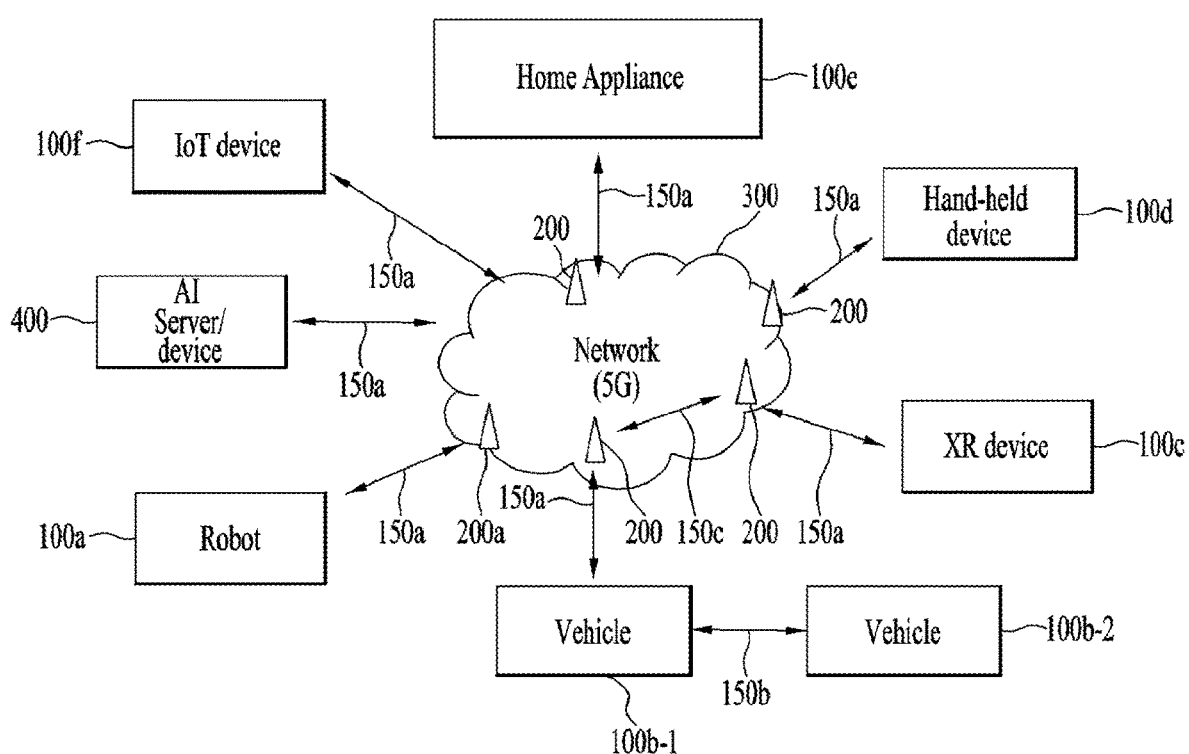
FIG. 2 shows an example of a wireless communication environment to which embodiments of the present disclosure may be applied.

FIG. 2 shows an example of a wireless communication environment to which embodiments of the present disclosure may be applied.

Referring to FIG. 2, the communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device includes a robot 100a, a vehicle 100b-1, 100b-2, an eXtended Reality (XR) device 100c, a hand-held device 100d, and a home appliance 100e, an Internet of Thing (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR) network. The wireless devices 100a to 100f may communicate with each other through the base station 200/network 300, but may also communicate directly (e.g., sidelink communication) without passing through the base station/network. For example, the vehicles 100b-1 and 100b-2 may perform direct communication (e.g., Vehicle to Vehicle (V2V)/Vehicle to everything (V2X) communication). In addition, the IoT device (e.g., sensor) may directly communicate with other IoT devices (e.g., sensor) or other wireless devices 100a to 100f.

Wireless communication/connection 150a, 150b, 150c may be performed between the wireless devices 100a to 100f and the base station 200 and between the base station 200 and the base station 200. Here, wireless communication/connection may be made through various wireless access technologies (e.g., 5G NR) such as uplink/downlink communication 150a, sidelink communication 150b (or D2D communication), and inter-base station communication 150c. Through the wireless communication/connection 150a, 150b, and 150c, the wireless device and the base station/wireless device, and the base station and the base station may transmit/receive radio signals to each other. For example, the wireless communication/connection 150a, 150b, and 150c may transmit/receive signals through various physical channels. To this end, based on various proposals of the present disclosure, at least part of various configuration information configuration processes, various signal processing processes (e.g., channel encoding/decoding, modulation/demodulation, resource mapping/demapping, etc.), resource allocation processes, etc. may be performed. Now, 5G communication including the NR system will be described.

The three main requirement areas of 5G are (1) Enhanced Mobile Broadband (eMBB) area, (2) Massive Machine Type Communication (mMTC) area, and (3) Ultra-reliable and Low Latency Communications (URLLC) are.

Some use cases may require multiple areas for optimization, while other use cases may focus on only one key performance indicator (KPI). 5G is to support these various use cases in a flexible and reliable way.

The eMBB goes far beyond basic mobile internet access, covering rich interactive work, media and entertainment applications in the cloud or augmented reality. Data is one of the key drivers of 5G, and for the first time in the 5G era, we may not see dedicated voice services. In voice is simply expected to be processed as an application using the data connection provided by the communication system. The main causes for increased traffic volume are an increase in content size and an increase in the number of applications requiring high data rates. Streaming services (audio and video), interactive video and mobile internet connections will become more widely used as more devices are connected to the internet. Many of these applications require always-on connectivity to push real-time information and notifications to users. Cloud storage and applications are growing rapidly in mobile communication platforms, which can be applied to both work and entertainment. In addition, cloud storage is a special use case that drives the growth of uplink data rates. 5G is also used for remote work in the cloud, requiring much lower end-to-end latency to maintain a good user experience when tactile interfaces are used. Entertainment, for example, cloud gaming and video streaming are other key factors that increase the demand for mobile broadband capabilities. Entertainment is essential on smartphones and tablets anywhere, including in high-mobility environments such as trains, cars and airplanes. Another use case is augmented reality for entertainment and information retrieval. Here, augmented reality requires very low latency and instantaneous amount of data.

In addition, one of the most anticipated 5G usage examples relates to the ability to seamlessly connect embedded sensors in all fields, that is, mMTC. By 2020, the number of potential IoT devices is expected to reach 20.4 billion. Industrial IoT is one of the areas where 5G will play a major role in enabling smart cities, asset tracking, smart utilities, agriculture and security infrastructure.

URLLC includes new services that will transform the industry through ultra-reliable/available low-latency links such as self-driving vehicles and remote control of critical infrastructure. This level of reliability and latency is essential for smart grid control, industrial automation, robotics, and drone control and coordination.

Next, a number of examples of use in a 5G communication system including an NR system will be described in more detail.

5G may complement fiber-to-the-home (FTTH) and cable-based broadband (or DOCSIS) as a means of providing streams rated from hundreds of megabits per second to gigabits per second. This high speed is required to deliver TVs in resolutions of 4K and higher (6K, 8K and higher), as well as virtual and augmented reality. Virtual Reality (VR) and Augmented Reality (AR) applications almost include immersive sporting events. Certain applications may require special network settings. For VR games, for example, game companies may need to integrate core servers with network operators' edge network servers to minimize latency.

Automotive is expected to be an important new driving force for 5G with many use cases for mobile communication to vehicles. For example, entertainment for passengers requires simultaneous high capacity and high mobility mobile broadband. The reason is that future users continue to expect high-quality connections regardless of their location and speed. Another use case in the automotive sector is augmented reality dashboards. It identifies objects in the dark and overlays information that tells the driver about the distance and movement of the object over what the driver is seeing through the front window. In the future, wireless modules will enable communication between vehicles, information exchange between vehicles and supporting infrastructure, and information exchange between automobiles and other connected devices (e.g., devices carried by pedestrians). Safety systems may help drivers lower the risk of accidents by guiding alternative courses of action to help them drive safer. The next step will be remote-controlled or self-driven vehicles. This requires very reliable and very fast communication between different self-driving vehicles and between vehicles and infrastructure. In the future, self-driving vehicles will perform all driving activities, allowing drivers to focus only on traffic anomalies that the vehicle itself cannot discern. The technological requirements of self-driving vehicles demand ultra-low latency and ultra-fast reliability to increase traffic safety to unattainable levels for humans.

Smart cities and smart homes, referred to as smart societies, will be embedded with high-density wireless sensor networks. A distributed network of intelligent sensors will identify conditions for cost and energy-efficient maintenance of a city or house. A similar setup can be performed for each household. Temperature sensors, window and heating controllers, burglar alarms and appliances are all connected wirelessly. Many of these sensors are typically low data rates, low power and low cost. However, for example, real-time HD video may be required in certain types of devices for surveillance.

The consumption and distribution of energy, including heat or gas, is highly decentralized, requiring automated control of distributed sensor networks. Smart grids use digital information and communication technologies to interconnect these sensors to gather information and act on it. This information may include supplier and consumer behavior, enabling smart grids to improve efficiency, reliability, economics, sustainability of production and distribution of fuels such as electricity in an automated manner. The smart grid can also be viewed as another low-latency sensor network.

The health sector has many applications that may benefit from mobile communications. The communication system may support telemedicine providing clinical care from a remote location. This may help reduce barriers to distance and improve access to consistently unavailable health care services in remote rural areas. It is also used to save lives in critical care and emergency situations. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. Achieving this, however, requires that the wireless connection operate with cable-like delay, reliability and capacity, and that its management be simplified. Low latency and very low error probability are new requirements that need to be connected with 5G.

Logistics and freight tracking are important use cases for mobile communications that enable tracking of inventory and packages from anywhere using location-based information systems. Logistics and freight tracking use cases typically require low data rates but require wide range and reliable location information.

Figure 3:
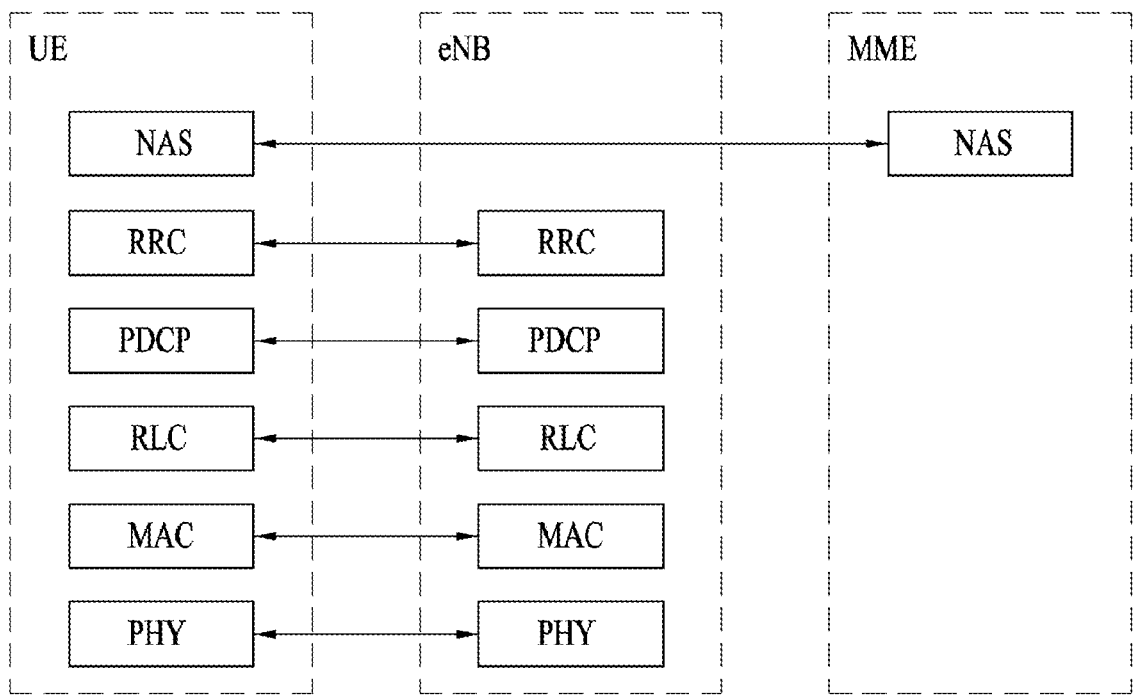
FIG. 3 is a diagram illustrating a control plane and a user plane structure of a Radio Interface Protocol between a terminal and E-UTRAN based on the 3GPP radio access network standard.
Figure 3:
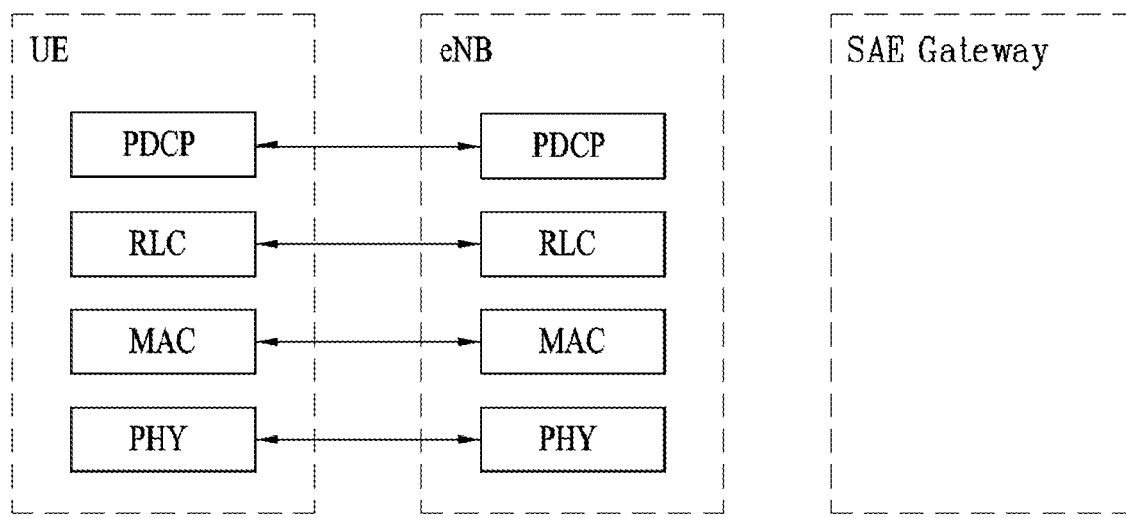

FIG. 3 is a diagram illustrating a control plane and a user plane structure of a Radio Interface Protocol between a terminal and E-UTRAN based on the 3GPP radio access network standard. The control plane refers to a path through which control messages used by a user equipment (UE) and a network to manage a call are transmitted. The user plane refers to a path through which data generated in the application layer, for example, voice data or internet packet data, is transmitted.

The Physical layer that is the first layer provides an information transfer service to the upper layer by using a physical channel. The physical layer is connected to the upper Medium Access Control layer through a Transport Channel. Data moves between the Medium Access Control layer and the Physical layer through the Transport Channel. Data moves between the physical layers of the transmitting side and the receiving side through a physical channel. The physical channel uses time and frequency as radio resources. Specifically, the physical channel is modulated by an Orthogonal Frequency Division Multiple Access (OFDMA) scheme in the downlink, and is modulated by a Single Carrier Frequency Division Multiple Access (SC-FDMA) scheme in the uplink.

The Medium Access Control (MAC) layer of the second layer provides a service to an upper layer, the Radio Link Control (RLC) layer, through a Logical Channel. The RLC layer of the second layer supports reliable data transmission. The function of the RLC layer may be implemented as a function block inside the MAC. The Packet Data Convergence Protocol (PDCP) layer of the second layer performs a header compression function that reduces unnecessary control information in order to efficiently transmit IP packets such as IPv4 or IPv6 over a narrow-bandwidth air interface.

The Radio Resource Control (RRC) layer located at the bottom of the third layer is defined only in the control plane. The RRC layer is responsible for controlling logical channels, transport channels, and physical channels in relation to configuration, re-configuration, and release of Radio Bearers. The radio bearer refers to a service provided by the second layer for data transfer between the UE and the network. To this end, RRC layers of the UE and the network exchange RRC messages with each other. If there is an RRC connection (RRC Connected) between the UE and the RRC layer of the network, the UE is in the RRC connected state (Connected Mode), otherwise it is in the RRC idle state (Idle Mode). The NAS (Non-Access Stratum) layer above the RRC layer performs functions such as session management and mobility management.

The downlink transport channel for transmitting data from the network to the UE includes a BCH (Broadcast Channel) for transporting system information, a PCH (Paging Channel) for transporting a paging message, and a downlink SCH (Shared Channel) for transporting user traffic or control messages, etc. In the case of downlink multicast or broadcast service traffic or control messages, they may be transported through a downlink SCH or may be transported through a separate downlink multicast channel (MCH). Meanwhile, as an uplink transport channel for transporting data from the UE to the network, there are a random access channel (RACH) for transporting an initial control message and an uplink shared channel (SCH) for transporting user traffic or control messages. Logical channels, which are located in upper level of the transport channel and mapped to the transmission channel, includes a Broadcast Control Channel (BCCH), a Paging Control Channel (PCCH), a Common Control Channel (CCCH), a Multicast Control Channel (MCCH), and a Multicast Channel (MTCH), etc.

Figure 4:
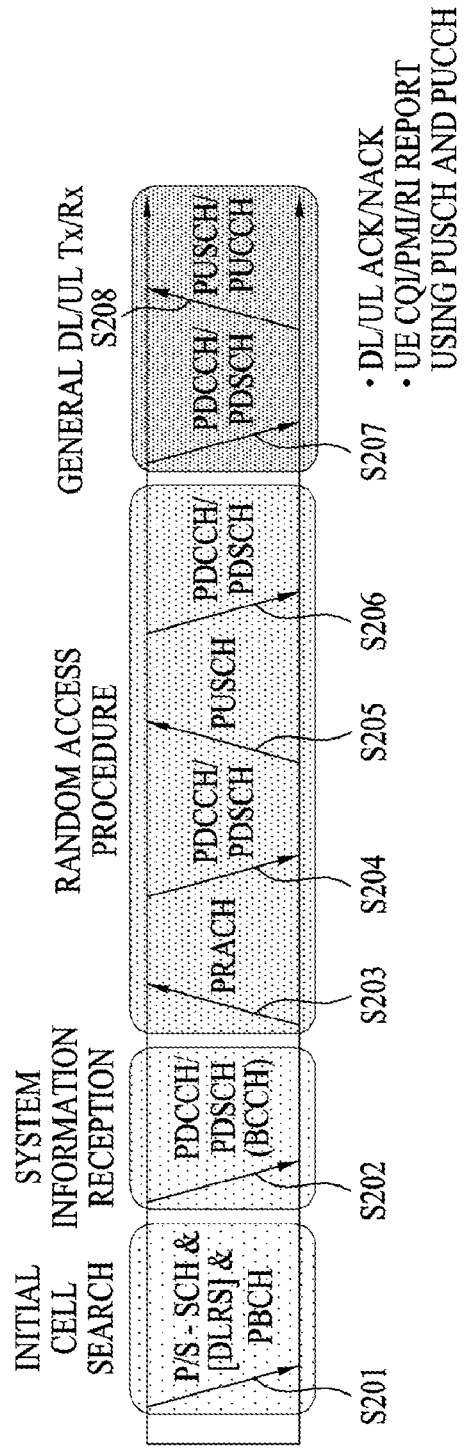
FIG. 4 is a diagram for explaining physical channels used in a 3GPP system and a general signal transmission method using them.

FIG. 4 is a diagram for explaining physical channels used in a 3GPP system and a general signal transmission method using them.

A UE performs an initial cell search operation such as synchronizing with the base station when the power is turned on or entering a new cell (S401). To this end, the UE may receive a primary synchronization signal (PSS) and a secondary synchronization signal (SSS) from the base station, synchronizes with the base station, and obtains information such as a cell ID. Thereafter, the UE may receive a physical broadcast channel (PBCH) from the base station to obtain intra-cell broadcast information. Meanwhile, the UE may receive a downlink reference signal (DL RS) in the initial cell search step to check the downlink channel state.

A UE that has completed the initial cell search may receive a physical downlink control channel (PDCCH) and a physical downlink shared channel (PDSCH) according to information carried on the PDCCH, and obtain more specific system information (S402).

Meanwhile, when there is no radio resource for the initial access to the base station or for a signal transmission, a UE may perform a random access procedure (RACH procedure) with respect to the base station (S403 to S406). To this end, a UE may transmit a specific sequence as a preamble through a Physical Random Access Channel (PRACH) (S403 and S405), and receive a response message ((Random Access Response (RAR) message) in response to the preamble through PDCCH and the corresponding PDSCH. In the case of contention-based RACH, a contention resolution procedure may be additionally performed (S406).

After performing the procedure as described above, a UE may perform PDCCH/PDSCH reception (S407) and a Physical Uplink Shared Channel (PUSCH)/physical uplink control channel (PUCCH) transmission (S408) as a general uplink/downlink signal transmission procedure. In particular, a UE may receive downlink control information (DCI) through the PDCCH. Here, the DCI includes control information such as resource allocation information for the UE, and different formats may be applied depending on the purpose of use.

Meanwhile, the control information that the UE transmits to the base station through the uplink or the UE receives from the base station may include a downlink/uplink ACK/NACK signal, CQI (Channel Quality Indicator), PMI (Precoding Matrix Index), RI (Rank Indicator), etc. A UE may transmit the above-described control information such as CQI/PMI/RI through PUSCH and/or PUCCH.

Meanwhile, NR system is considering a method of using a high ultra-high frequency band, that is, a millimeter wave frequency band of 6 GHz or more, in order to transmit data while maintaining a high data rate to a large number of users using a wide frequency band. In 3GPP, this is used as the name of NR, and in the present disclosure, it will be referred to as NR system.

NR supports multiple OFDM (Orthogonal Frequency Division Multiplexing) numerologies (or subcarrier spacing (SCS) to support various 5G services. For example, when the SCS is 15 kHz, it supports a wide area in traditional cellular bands, and when the SCS is it supports dense-urban, lower latency and a wider carrier bandwidth, and when the SCS is 60 kHz or higher, it supports a bandwidth greater than 24.25 kHz to overcome phase noise.

NR frequency band is defined as two types of frequency range (FR1, FR2). FR1 is the sub 6 GHz range, and FR2 is the above 6 GHz range which may mean millimeter wave (mmW). Table 1 below shows the definition of the NR frequency band.

TABLE 1

| Frequency Range Designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Discontinuous Reception (DRX) Operation

The UE may perform the DRX operation while performing the procedures and/or methods described/proposed above. The DRX configured UE may reduce power consumption by discontinuously receiving the DL signal. DRX may be performed in RRC (Radio Resource Control)_IDLE state, RRC_INACTIVE state, and RRC_CONNECTED state. In RRC_IDLE state and RRC_INACTIVE state, DRX is used to receive paging signal discontinuously. Hereinafter, DRX performed in the RRC_CONNECTED state will be described (RRC_CONNECTED DRX).

Figure 5:
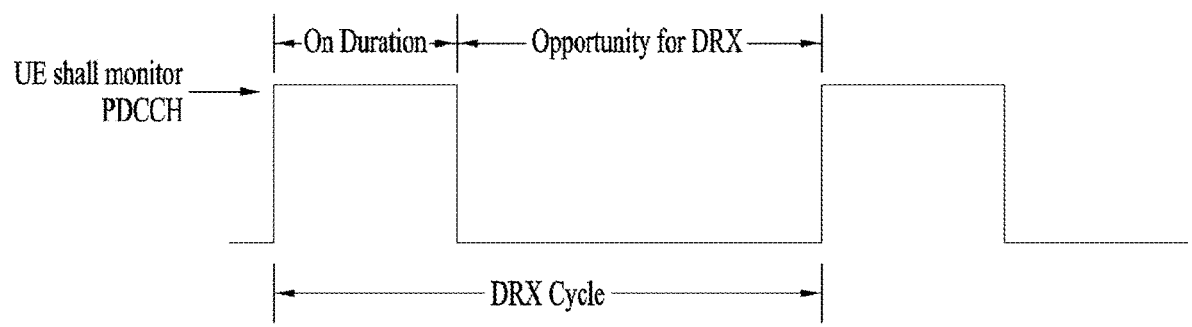
FIG. 5 is a diagram for explaining an embodiment of a discontinuous reception (DRX) operation.

FIG. 5 is a diagram for explaining an embodiment of a discontinuous reception (DRX) operation.

Referring to FIG. 5, the DRX cycle consists of On Duration and Opportunity for DRX. The DRX cycle defines a time interval in which On Duration is periodically repeated. On Duration indicates a time period that the UE monitors to receive the PDCCH. When DRX is configured, the UE performs PDCCH monitoring during On Duration. If there is a successfully detected PDCCH during PDCCH monitoring, the UE operates an inactivity timer and maintains an awake state. On the other hand, if there is no PDCCH successfully detected during PDCCH monitoring, the UE enters a sleep state after On Duration ends. Accordingly, when DRX is configured, PDCCH monitoring/reception may be discontinuously performed in the time domain in performing the procedures and/or methods described/proposed above. For example, when DRX is configured, in the present disclosure, a PDCCH reception opportunity (e.g., a slot having a PDCCH search space) may be configured discontinuously according to the DRX configuration. On the other hand, when DRX is not configured, PDCCH monitoring/reception may be continuously performed in the time domain in performing the procedures and/or methods described/proposed above. For example, when DRX is not configured, PDCCH reception opportunities (e.g., a slot having a PDCCH search space) in the present disclosure may be continuously configured. Meanwhile, regardless of whether DRX is configured or not, PDCCH monitoring may be limited in a time interval configured as a measurement gap.

Table 2 shows the process of the UE related to DRX (RRC_CONNECTED state). Referring to table 23, DRX configuration information is received through higher layer (e.g., RRC) signaling, and whether DRX on/off is controlled by a DRX command of MAC layer. If DRX is configured, the UE may discontinuously perform PDCCH monitoring in performing the procedures and/or methods proposed/described in the present disclosure, as illustrated in FIG. 5.

TABLE 2

| | Type of signals | UE procedure |
| --- | --- | --- |
| $1^{st}$ step | RRC signalling(MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

Here, MAC-CellGroupConfig includes configuration information necessary to configure MAC (Medium Access Control) parameters for the cell group. MAC-CellGroupConfig may also include configuration information related to DRX. For example, MAC-CellGroupConfig may include information as follows to define DRX.—Value of drx-OnDurationTimer: defines the length of the start duration of the DRX cycle Value of drx-InactivityTimer: defines the length of the time duration in which the UE remains awake after PDCCH occasion in which PDCCH indicating the initial UL or DL data is detected.

Value of drx-HARQ-RTT-TimerDL: defines the maximum time duration from when DL initial transmission is received until DL retransmission is received.

Value of drx-HARQ-RTT-TimerDL: defines the length of the maximum time duration from when grant for UL initial transmission is received until grant for UL retransmission is received.

drx-LongCycleStartOffset: defines the length of time and the starting point of DRX cycle.

drx-ShortCycle (optional): defines the time duration of short DRX cycle

Here, if any one of drx-OnDurationTimer, drx-InactivityTimer, drx-HARQ-RTT-TimerDL, drx-HARQ-RTT-TimerDL is in operation, the UE performs PDCCH monitoring at every PDCCH occasion while maintaining the awake state.

Multiplexing of Short PUCCH and Long PUCCH

Figure 6:
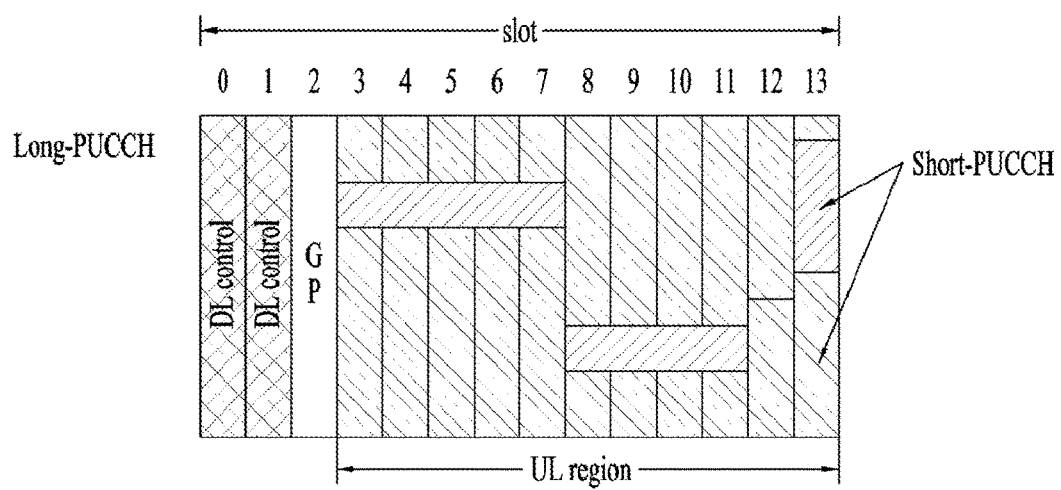
FIG. 6 is a diagram for explaining multiplexing of a Long Physical Uplink Control Channel (PUCCH) and a Short PUCCH in an NR system.

FIG. 6 illustrates a configuration of multiplexing of a Long Physical Uplink Control Channel (PUCCH) and a Short PUCCH.

PUCCH (e.g., PUCCH format 0/2) and PUSCH may be multiplexed in TDM or FDM scheme. Short PUCCH and long PUCCH from different UEs may be multiplexed in TDM or FDM scheme. Short PUCCHs in one slot from a single UE may be multiplexed in TDM scheme. A short PUCCH and a long PUCCH from in one slot a single UE may be multiplexed in TDM or FDM scheme.

ACK/NACK Transmission

Figure 7:
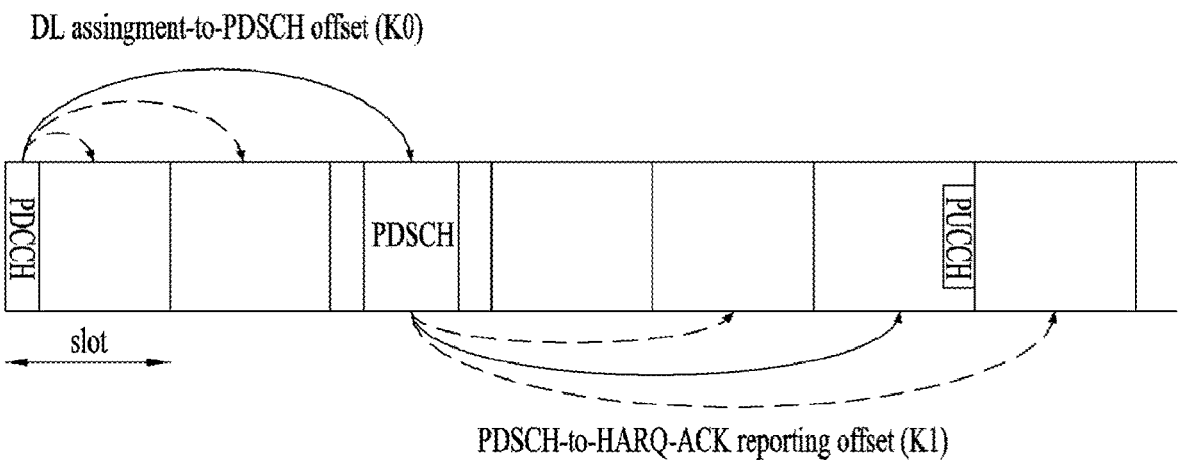
FIG. 7 illustrates an ACK/NACK transmission process.

FIG. 7 exemplifies ACK/NACK transmission procedure. Referring to FIG. 7, the UE may detect the PDCCH in slot #n. Here, the PDCCH includes downlink scheduling information (e.g., DCI formats 1_0 and 1_1), and the PDCCH indicates a DL assignment-to-PDSCH offset (1(0) and a PDSCH-HARQ-ACK reporting offset (1(1). For example, DCI formats 1_0 and 1_1 may include the following information.

Frequency domain resource assignment: it indicates RB set allocated to the PDSCH.

Time domain resource assignment: K0, it indicates the starting position (e.g., OFDM symbol index) and length (e.g., number of OFDM symbols) of the PDSCH in the slot.

PDSCH-to-HARQ feedback timing indicator: it indicates K1

Thereafter, the UE may transmit the UCI through the PUCCH in the slot #(n+K1) after receiving the PDSCH in the slot #(n+K0) according to the scheduling information of the slot #n. Here, the UCI includes a HARQ-ACK response for the PDSCH. If the PDSCH is configured to transmit up to 1 TB, the HARQ-ACK response may be configured with 1-bit. When the PDSCH is configured to transmit up to two TBs, the HARQ-ACK response may be configured with 2-bits when spatial bundling is not configured, and may be configured with 1-bits when spatial bundling is configured. When the HARQ-ACK transmission time for the plurality of PDSCHs is designated as slot #(n+K1), the UCI transmitted in the slot #(n+K1) includes HARQ-ACK responses for the plurality of PDSCHs.

Figure 8:
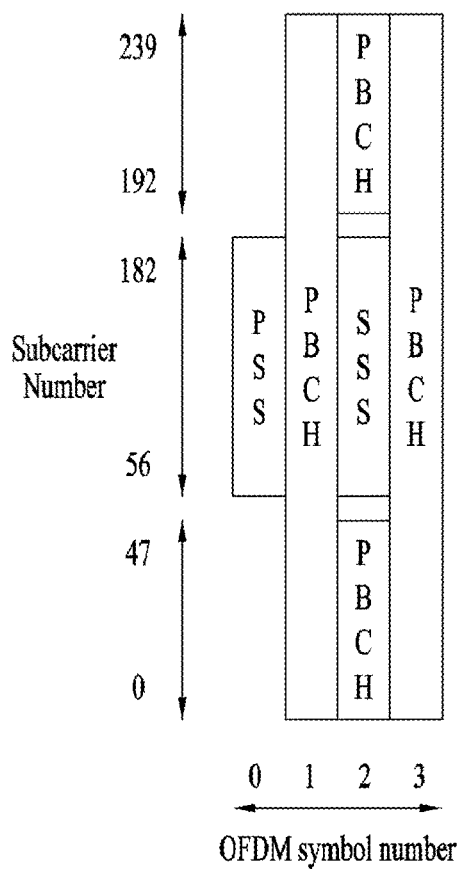
FIGS. 8 to 13 are diagrams for explaining a composition and a transmission method of an SS/PBCH block.

FIG. 8 illustrates an SSB structure. The UE may perform, based on the SSB, cell search, system information acquisition, beam alignment for initial access, DL measurement, etc. SSB and SS/PBCH (Synchronization Signal/Physical Broadcast channel) block may be used interchangeably.

Referring to FIG. 8, SSB is composed of PSS, SSS and PBCH. The SSB is configured in four consecutive OFDM symbols, and PSS, PBCH, SSS/PBCH and PBCH are transmitted for each OFDM symbol. PSS and SSS consist of 1 OFDM symbol and 127 subcarriers, respectively, and PBCH consists of 3 OFDM symbols and 576 subcarriers. Polar coding and Quadrature Phase Shift Keying (QPSK) are applied to the PBCH. The PBCH consists of a data RE and a demodulation reference signal (DMRS) RE for each OFDM symbol. Three DMRS REs exist for each RB, and three data REs exist between DMRS REs.

Cell Search

Cell search refers to a process in which the UE acquires time/frequency synchronization of a cell and detects a cell ID (e.g., Physical layer Cell ID (PCID)) of the cell. PSS is used to detect a cell ID within a cell ID group, and SSS is used to detect a cell ID group. PBCH is used for SSB (time) index detection and half-frame detection.

The cell search process of the UE may be organized as shown in Table 3 below.

TABLE 3

| | Type of Signals | Operations |
| --- | --- | --- |
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index(Slot and frame boundary detection) |
| 4th Step | PBCH | * Time information (80 ms, System Frame Number (SFN), SSB index, HF) * Remaining Minimum System Information (RMSI) Control resource set (CORESET)/Search space configuration |
| 5th Step | PDCCH and PDSCH | * Cell access information* RACH configuration |

Figure 9:
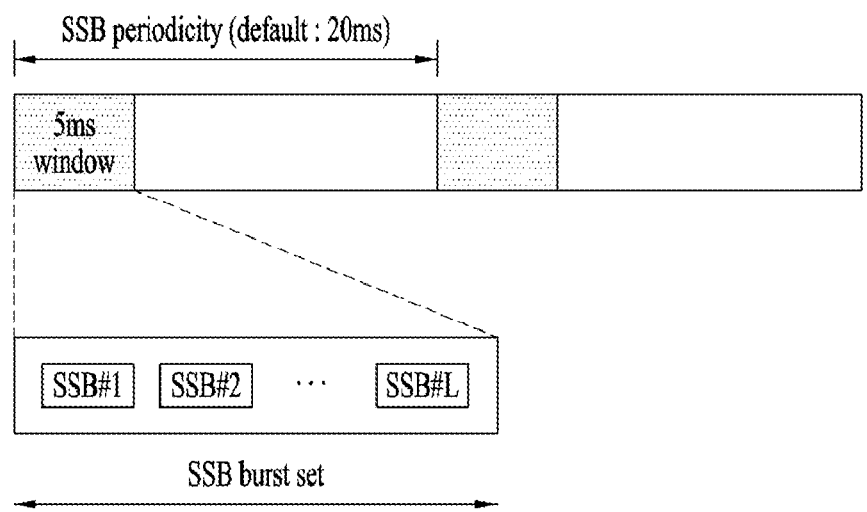

FIG. 9 illustrates an SSB transmission.

The SSB is transmitted periodically according to the SSB periodicity. The SSB basic period assumed by the UE during initial cell search is defined as 20 ms. After cell access, the SSB periodicity may be set to one of {5 ms, 10 ms, 20 ms, 40 ms, 80 ms, 160 ms} by a network (e.g., a base station). An SSB burst set is configured at the beginning of the SSB periodicity. The SSB burst set configured as a 5 ms time window (i.e., half-frame), and the SSBs may be transmitted up to L times within the SS burst set. The maximum transmission number, L, of the SSB may be given as follows according to the frequency band of the carrier. One slot includes up to two SSBs.

For frequency range up to 3 GHz, L=4
For frequency range from 3 GHz to 6 GHz, L=8
For frequency range from 6 GHz to 52.6 GHz, L=64

The temporal position of the SSB candidate in the SS burst set may be defined as follows according to the SCS. The temporal positions of SSB candidates are indexed from 0 to L-1 (SSB index) in temporal order within a SSB burst set (i.e., half-frame).

Case A—15 kHz SCS: The index of the start symbol of the candidate SSB is given as {2, 8}+14*n. If the carrier frequency is 3 GHz or less, n=0, 1. If the carrier frequency is 3 GHz to 6 GHz, n=0, 1, 2, 3.

Case B—30 kHz SCS: The index of the start symbol of the candidate SSB is given as {4, 8, 16, 20}+28*n. If the carrier frequency is 3 GHz or less, n=0. When the carrier frequency is 3 GHz to 6 GHz, n=0, 1.

Case C—30 kHz SCS: The index of the start symbol of the candidate SSB is given as {2, 8}+14*n. If the carrier frequency is 3 GHz or less, n=0, 1. If the carrier frequency is 3 GHz to 6 GHz, n=0, 1, 2, 3.

Case D—120 kHz SCS: The index of the start symbol of the candidate SSB is given as {4, 8, 16, 20}+28*n. For carrier frequencies greater than 6 GHz, n=0, 1, 2, 3, 5, 6, 7, 8, 10, 11, 12, 13, 15, 16, 17, 18.

Case E—240 kHz SCS: The index of the start symbol of the candidate SSB is given as {8, 12, 16, 20, 32, 36, 40, 44}+56*n. For carrier frequencies greater than 6 GHz, n=0, 1, 2, 3, 5, 6, 7, 8.

Figure 10:
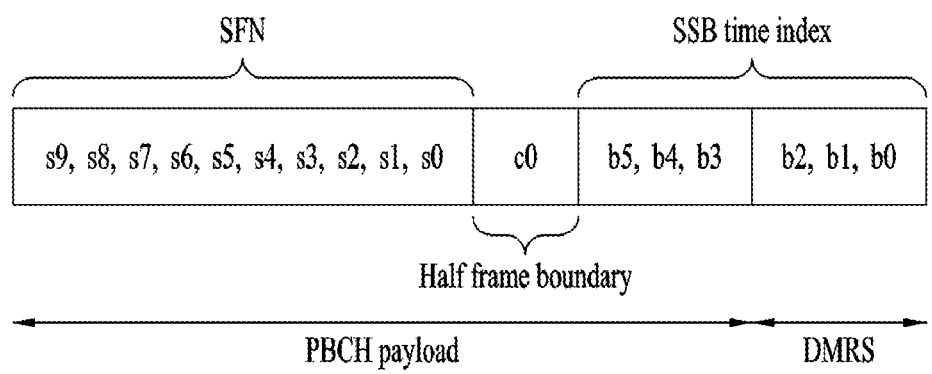

FIG. 10 illustrates a UE obtaining information about DL time synchronization.

The UE may acquire DL synchronization by detecting the SSB. The UE may identify the structure of the SSB burst set based on the detected SSB index, and thus may detect a symbol/slot/half-frame boundary. The number of the frame/ half-frame to which the detected SSB belongs may be identified using the SFN information and the half-frame indication information.

Specifically, the UE may obtain 10-bit SFN (System Frame Number) information from the PBCH (s0-s9). Out of the 10-bit SFN information, 6 bits are obtained from a Master Information Block (MIB), and the remaining 4 bits are obtained from a PBCH Transport Block (TB).

Next, the UE may obtain 1-bit half-frame indication information (c0). When the carrier frequency is 3 GHz or less, the half-frame indication information may be implicitly signaled using the PBCH DMRS. The PBCH DMRS indicates 3-bit information by using one of eight PBCH DMRS sequences. Therefore, in the case of L=4, after indicating the SSB index among 3 bits that can be indicated using 8 PBCH DMRS sequences, remaining one bit can be used for half-frame indication.

Lastly, the UE may obtain the SSB index based on the DMRS sequence and the PBCH payload. SSB candidates are indexed from 0 to L-1 in temporal order within a SSB burst set (i.e., half-frame). When L=8 or 64, LSB (Least Significant Bit) 3 bits of the SSB index may be indicated using 8 different PBCH DMRS sequences (b0-b2). When L=64, MSB (Most Significant Bit) 3 bits of the SSB index are indicated through the PBCH (b3-b5). When L=2, LSB 2 bits of the SSB index may be indicated using four different PBCH DMRS sequences (b0, b1). When L=4, after indicating the SSB index among 3 bits that can be indicated using 8 PBCH DMRS sequences, remaining one bit can be used for half-frame indication (b2).

Acquiring System Information

Figure 11:
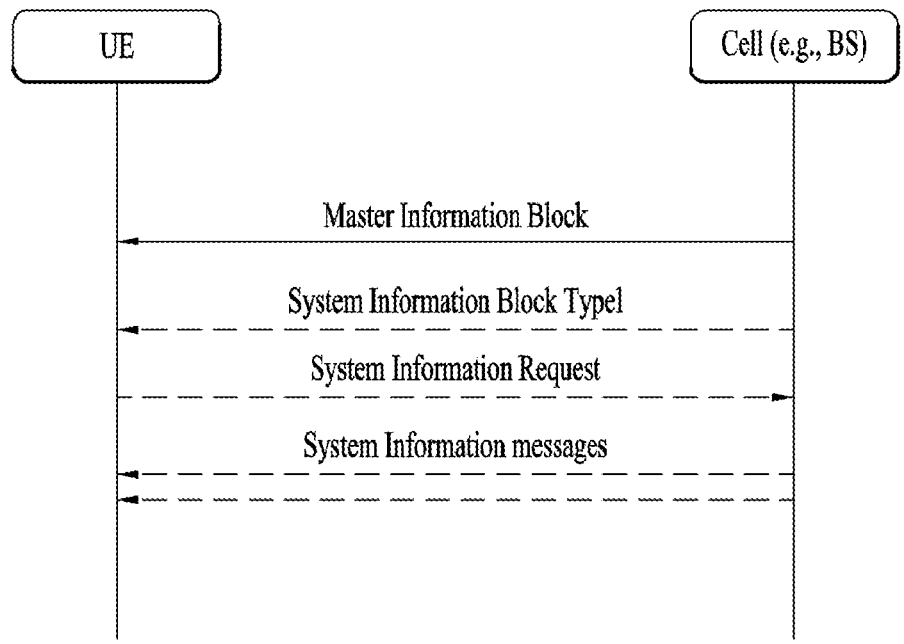

FIG. 11 illustrates a system information (SI) acquisition process. A UE may acquire AS-/NAS-information through the SI acquisition process. The SI acquisition process may be applied to UEs in RRC_IDLE state, RRC_INACTIVE state, and RRC_CONNECTED state.

SI is divided into MIB (Master Information Block) and a plurality of SIBs (System Information Block)s. The MIB and the plurality of SIBs may be divided into a Minimum SI and Other SI. Here, the minimum SI may be composed of MIB and SIB1, and includes information for obtaining basic information required for initial access and other information. Here, SIB1 may be referred to as Remaining Minimum System Information (RMSI). For more details, followings may be referred.

MIB includes information/parameters related to SIB1 (SystemInformationBlockType1) reception and is transmitted through the PBCH of the SSB. For initial cell selection, the UE assumes that the half-frame having the SSB is repeated at a periodicity of 20 ms. The UE may check whether a Control Resource Set (CORE-SET) for the Type0-PDCCH common search space exists based on the MIB. The Type0-PDCCH common search space is a type of PDCCH search space and is used to transmit a PDCCH scheduling an SI message. When the Type0-PDCCH common search space exists, the UE may determine, based on information in the MIB (e.g., pdcch-ConfigSD31), (i) a plurality of consecutive RBs and one or more consecutive symbols constituting CORESET and (ii) PDCCH occasion (i.e., a time domain position for receiving PDCCH). When the Type0-PDCCH common search space does not exist, pdcch-ConfigSIB1 provides information about a frequency location in which SSB/SD31 exists and a frequency range in which SSB/SD31 does not exist.

SIB1 includes information related to availability and scheduling (e.g., transmission periodicity, SI-window size) of the remaining SIBs (hereinafter, SIBx, x is an integer greater than or equal to 2). For example, SIB1 may inform whether SIBx is periodically broadcast or provided based on the request of the UE by an on-demand method. When SIBx is provided by the on-demand method, SIB1 may include information necessary for the UE to perform an SI request. SIB1 is transmitted through the PDSCH, the PDCCH scheduling SIB1 is transmitted through the Type0-PDCCH common search space, and SIB1 is transmitted through the PDSCH indicated by the PDCCH.

SIBx is included in the SI message and transmitted through the PDSCH. Each SI message is transmitted within a periodically occurring time window (i.e., an SI-window).

Beam Alignment

Figure 12:
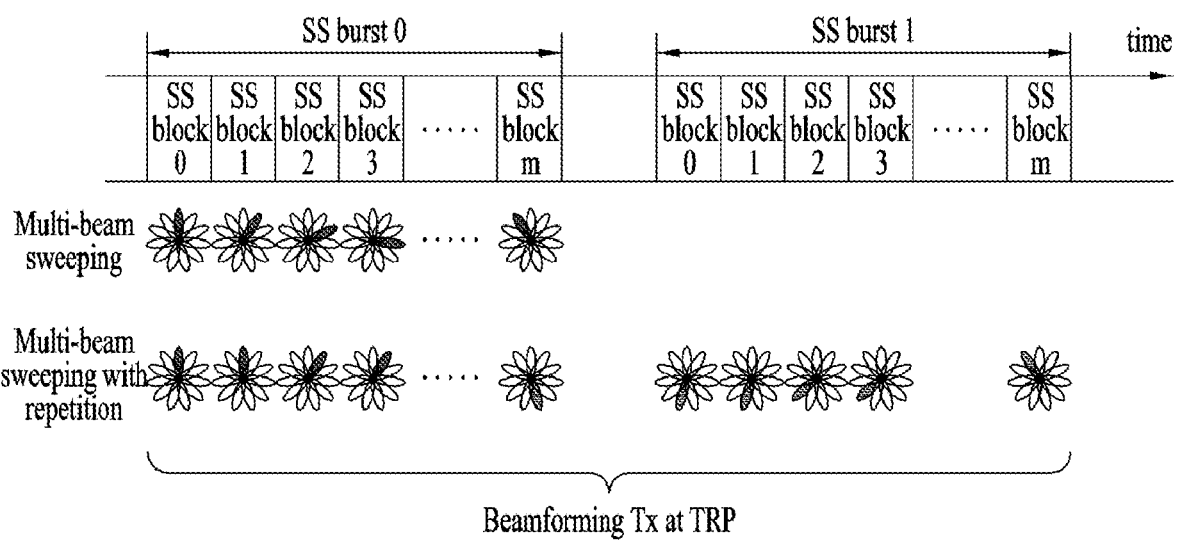

FIG. 12 illustrates multi-beam transmission of SSB.

Beam sweeping means that a Transmission Reception Point (TRP) (e.g., a base station/cell) changes a beam (direction) of a radio signal according to time (hereinafter, a beam and a beam direction may be used interchangeably). SSB may be transmitted periodically using beam sweeping. In this case, SSB index is implicitly linked with the SSB beam. SSB beam may be changed in units of SSB (index) or may be changed in units of SSB (index) group. In the latter case, SSB beam remains the same within a SSB (index) group. That is, the transmission beam direction of SSB is repeated in a plurality of consecutive SSBs. The maximum number of transmissions L of the SSB in a SSB burst set has a value of 4, 8, or 64 depending on the frequency band to which the carrier belongs. Accordingly, the maximum number of SSB beams in the SSB burst set may also be given as follows according to the frequency band of the carrier.

For frequency range up to 3 GHz, Max number of beams=4

For frequency range from 3 GHz to 6 GHz, Max number of beams=8

For frequency range from 6 GHz to 52.6 GHz, Max number of beams=64

When multi-beam transmission is not applied, the number of SSB beams is one.

When a UE attempts an initial access to a base station, UE may align the beam with the base station based on the SSB. For example, the UE identifies the best SSB after performing SSB detection. Thereafter, the UE may transmit the RACH preamble to the base station using the PRACH resource linked/corresponding to the index (i.e., beam) of the best SSB. The SSB may be used to align beams between the base station and the UE even after initial access.

Channel Measurement and Rate-Matching

Figure 13:
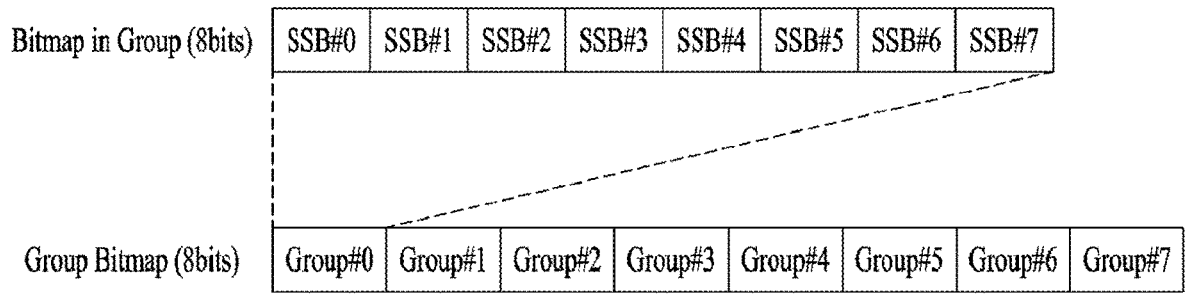

FIG. 13 illustrates a method of informing an actually transmitted SSB (SSB_tx).

A maximum of L SSBs may be transmitted within a SSB burst set, and the number/location of SSBs actually transmitted may vary for each base station/cell. The number/location of SSBs actually transmitted is used for rate-matching and measurement, and information about the actually transmitted SSBs is indicated as follows.

Case related to rate-matching: It may be indicated through UE-specific RRC signaling or RMSI. UE-specific RRC signaling includes a full (e.g., length L) bitmap in both the below 6 GHz and above 6 GHz frequency ranges. Meanwhile, RMSI includes a full bitmap at below 6 GHz, and includes a compressed bitmap at 6 GHz above as shown. Specifically, information about the actually transmitted SSB may be indicated using a group-bitmap (8 bits)+an intra-group bitmap (8 bits).

Here, a resource (e.g., RE) indicated through UE-specific RRC signaling or RMSI is reserved for SSB transmission, and PDSCH/PUSCH, etc. may be rate-matched in consideration of SSB resources.

Case related to measurement: In case of an RRC connected mode, a network (e.g., a base station) may indicate an SSB set to be measured within a measurement period. The SSB set may be indicated for each frequency layer. If there is no indication regarding the SSB set, the default SSB set is used. The default SSB set includes all SSBs in the measurement period. The SSB set may be indicated using a full (e.g., length L) bitmap of RRC signaling. In case of an RRC idle mode, the default SSB set is used.

Figure 14:
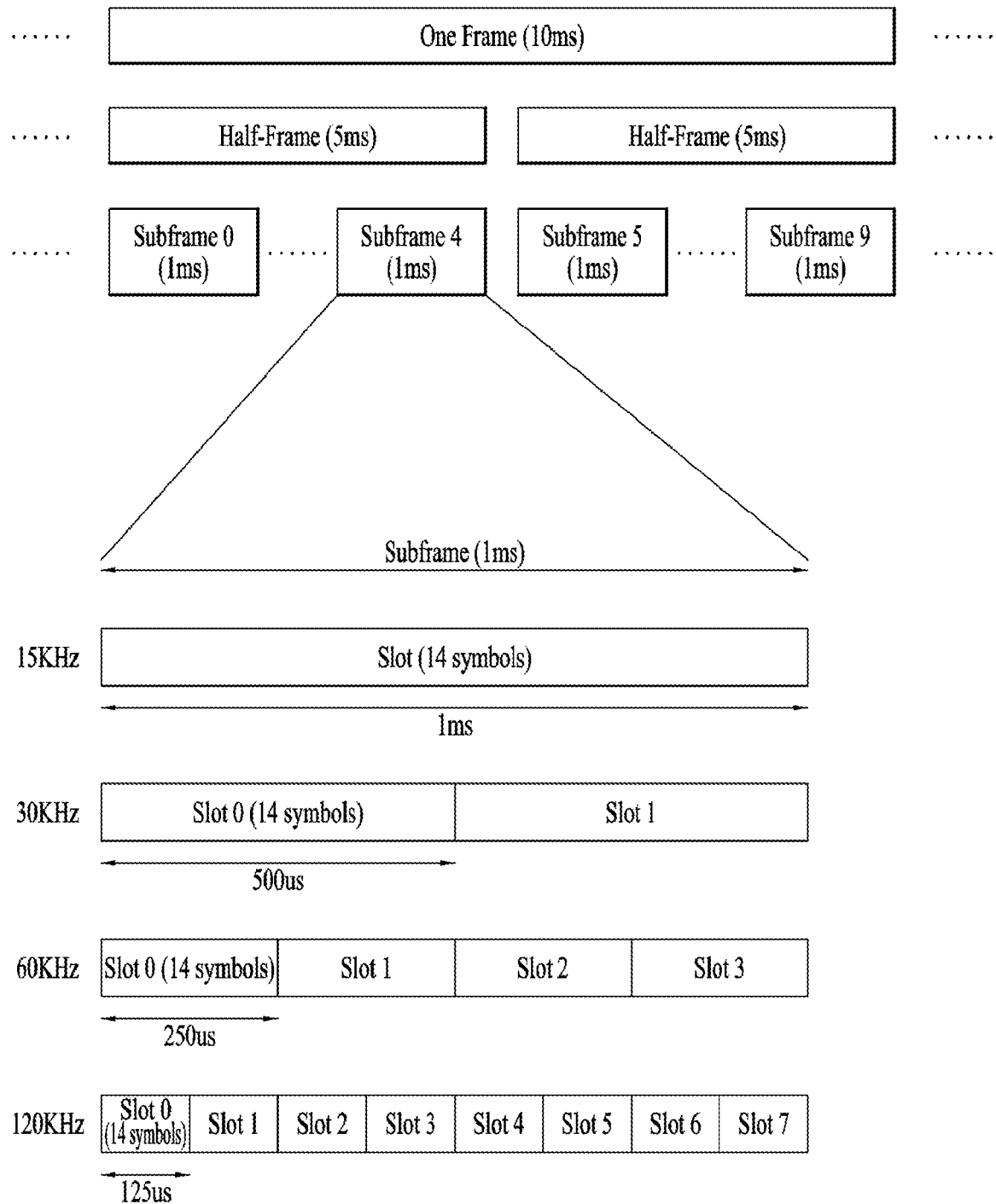
FIGS. 14 to 16 are diagrams for explaining the structure of a radio frame and slot used in NR system.

FIG. 14 illustrates a structure of a radio frame used in NR.

In NR, uplink and downlink transmission is configured as frames. A radio frame has a length of 10 ms and is defined as two half-frames (HF) of 5 ms. A half-frame is defined as 5 subframes (SFs) of 1 ms. A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. Here, the symbol may include an OFDM symbol (or a CP-OFDM symbol), an SC-FDMA symbol (or a DFT-s-OFDM symbol).

Table 4 illustrates that the number of symbols per slot, the number of slots per frame, and the number of slots per subframe vary according to SCS when a normal CP is used.

TABLE 4

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: the number of slots in a frame
*$N^{subframe, u}_{slot}$: the number of slots in a subframe Table 5 illustrates that the number of symbols per slot, the number of slots per frame, and the number of slots per subframe vary according to SCS, when an extended CP is used.

TABLE 5

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In NR system, OFDM(A) numerology (e.g., SCS, CP length, etc.) may be configured differently between a plurality of cells aggregated into one UE. Accordingly, an (absolute time) duration of a time resource (e.g., SF, slot, or TTI) (referred to as TU (Time Unit) for convenience) composed of the same number of symbols may be configured differently between aggregated cells.

Figure 15:
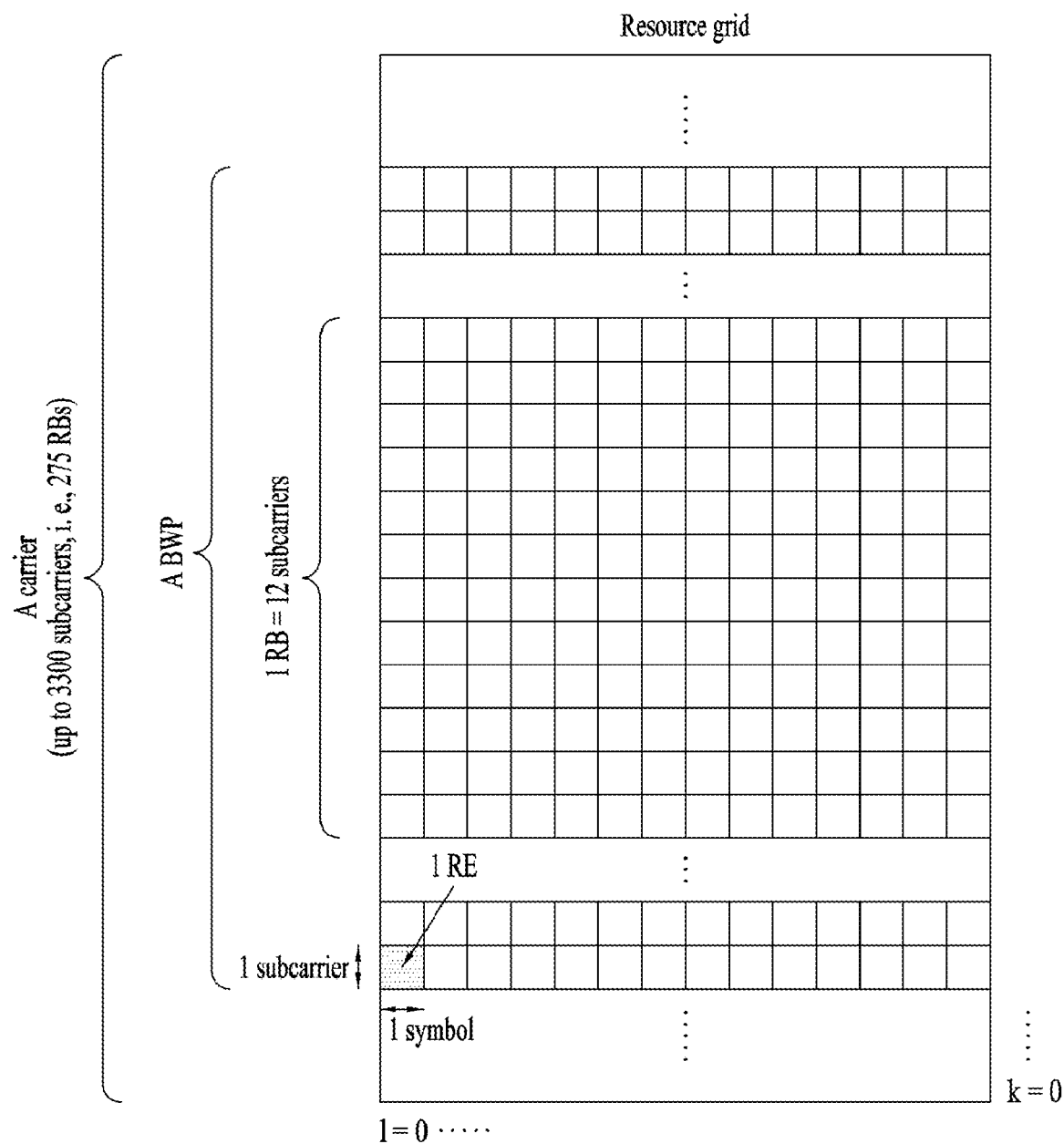

FIG. 15 illustrates a slot structure of an NR frame. A slot includes a plurality of symbols in a time domain. For example, in the case of a normal CP, one slot includes 14 symbols, but in the case of an extended CP, one slot includes 12 symbols. The carrier includes a plurality of subcarriers in a frequency domain. A resource block (RB) is defined as a plurality (e.g., 12) of consecutive subcarriers in a frequency domain. A bandwidth part (BWP) is defined as a plurality of consecutive (P)RBs in a frequency domain, and may correspond to one numerology (e.g., SCS, CP length, etc.). A carrier may include a maximum of N (e.g., 4) BWPs. Data communication is performed through an activated BWP, and only one BWP can be activated for one UE. Each element in the resource grid is referred to as a resource element (RE), and one complex symbol may be mapped.

Figure 16:
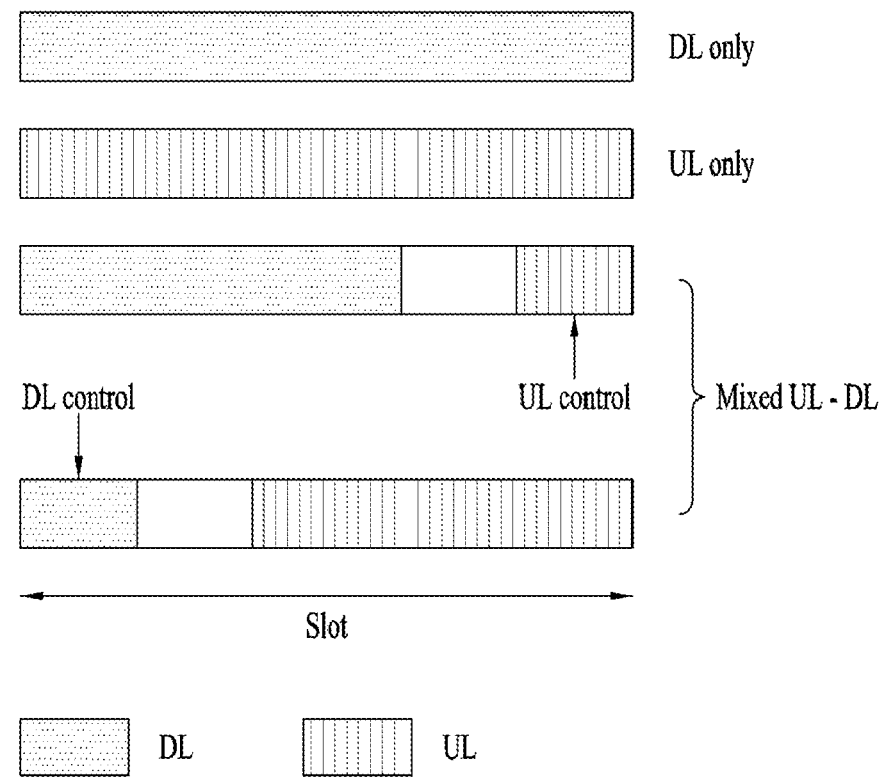

FIG. 16 illustrates a structure of a self-contained slot. In a NR system, a frame is characterized by a self-contained structure in which a DL control channel, DL or UL data, and a UL control channel can all be included in one slot. For example, the first N symbols in a slot may be used to transmit a DL control channel (hereinafter, DL control region), and the last M symbols in a slot may be used to transmit a UL control channel (hereinafter, UL control region). N and M are each an integer greater than or equal to 0. A resource region (hereinafter, referred to as a data region) between the DL control region and the UL control region may be used for DL data transmission or for UL data transmission. As an example, the following configuration may be considered. Each duration is listed in chronological order.

1. DL Only Configuration
2. UL Only Configuration
3. Mixed UL-DL Configuration
   DL region+Guard Period (GP)+UL control region
   DL control region+GP+UL region
   DL region: (i) DL data region, (ii) DL control region+DL data region
   UL region: (i) UL data region, (ii) UL data region+UL control region A PDCCH may be transmitted in a DL control region, and a PDSCH may be transmitted in a DL data region. A PUCCH may be transmitted in a UL control region, and a PUSCH may be transmitted in a UL data region. In the PDCCH, downlink control information (DCI), for example, DL data scheduling information, UL data scheduling information, etc. may be transmitted. In PUCCH, Uplink Control Information (UCI), for example, ACK/NACK (Positive Acknowledgment/Negative Acknowledgment) information for DL data, CSI (Channel State Information) information, SR (Scheduling Request), etc. may be transmitted. A GP provides a time gap in the process of a base station and a UE switching from a transmission mode to a reception mode or in the process of switching from a reception mode to a transmission mode. Some symbols of the time of switching from DL to UL in a subframe may be configured to GP.

Bandwidth Part (BWP)

In the NR system, up to 400 MHz per one carrier may be supported. If the UE operating on such a wideband carrier always operates with a radio frequency (RF) module for the entire carrier turned on, the UE battery consumption may increase. Alternatively, when considering several use cases (e.g, eMBB, URLLC, mMTC, V2X, etc.) operating in one wideband carrier, different numerology (e.g., subcarrier spacing) for each frequency band within the corresponding carrier may be supported. Alternatively, the capability for the maximum bandwidth may be different for each UE. In consideration of the above, the base station may indicate the UE to operate only in a partial bandwidth rather than the entire bandwidth of the wideband carrier, and the partial bandwidth is referred to as a bandwidth part (BWP). In the frequency domain, BWP is a subset of contiguous common resource blocks defined for numerology pi in bandwidth part i on the carrier, and one numerology (e.g., subcarrier spacing, CP length, slot/mini-slot duration) may be configured.

Meanwhile, the base station may configure one or more BWPs in one carrier configured for the UE. Alternatively, when UEs are concentrated in a specific BWP, some UEs may be moved to another BWP for load balancing. Alternatively, in consideration of frequency domain inter-cell interference cancellation between neighboring cells, a middle partial spectrum from the entire bandwidth may be excluded and both edge BWPs of the cell may be configured in the same slot. That is, the base station may configure at least one DL/UL BWP to the UE associated with the wideband carrier, and activate (by L1 signaling which is a physical layer control signal, a MAC control element (CE) which is a MAC layer control signal, or RRC signaling, etc.) at least one DL/UL BWP among the configured DL/UL BWP(s) at a specific time, indicate (by L1 signaling, MAC CE, or RRC signaling, etc.) to switch to another configured DL/UL BWP, or set a timer value and cause the UE to switch to a determined DL/UL BWP when the timer expires. Here, in order to indicate switching to another configured DL/UL BWP, DCI format 1_1 or DCI format 0_1 may be used. The activated DL/UL BWP is specifically referred to as an active DL/UL BWP. In a situation such as when the UE is in the process of initial access or before the RRC connection of the UE is set up, the UE may not receive configuration for DL/UL BWP. In this situation, the DL/UL BWP assumed by the UE is referred to as an initial active DL/UL BWP.

Meanwhile, here, the DL BWP is a BWP for transmitting and receiving a downlink signal such as PDCCH and/or PDSCH, and the UL BWP is a BWP for transmitting and receiving an uplink signal such as PUCCH and/or PUSCH.

In the NR system, a downlink channel and/or a downlink signal may be transmitted/received within an active DL Downlink Bandwidth Part (BWP). In addition, an uplink channel and/or an uplink signal may be transmitted/received within an active UL Uplink Bandwidth Part (BWP).

Downlink Channel Structure

A base station transmits a related signal to a UE through a downlink channel to be described later, and the UE receives the related signal from the base station through the downlink channel to be described later.

(1) Physical Downlink Shared Channel (PDSCH)

PDSCH carries downlink data (e.g., DL-shared channel transport block, DL-SCH TB), and modulation methods such as QPSK (Quadrature Phase Shift Keying), 16 QAM (Quadrature Amplitude Modulation), 64 QAM, 256 QAM, etc. is applied. A codeword is generated by encoding the TB. The PDSCH may carry up to two codewords. Scrambling and modulation mapping are performed for each codeword, and modulation symbols generated from each codeword are mapped to one or more layers (Layer mapping). Each layer is mapped to a resource together with a demodulation reference signal (DMRS), is generated as an OFDM symbol signal, and is transmitted through a corresponding antenna port.

(2) Physical Downlink Control Channel (PDCCH)

PDCCH carries downlink control information (DCI), and QPSK modulation method is applied. One PDCCH is composed of 1, 2, 4, 8, or 16 Control Channel Elements (CCEs) according to an Aggregation Level (AL). One CCE consists of six Resource Element Groups (REGs). One REG is defined as one OFDM symbol and one (P)RB.

Figure 17:
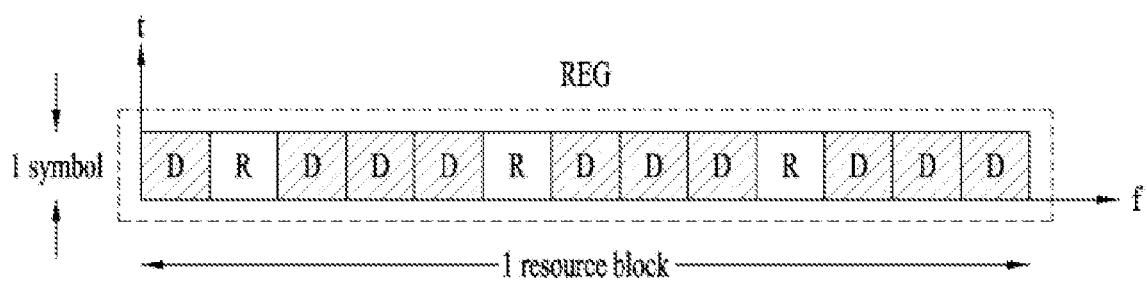
FIGS. 17 to 19 are diagrams for explaining a physical downlink control channel (PDCCH) in NR system.

FIG. 17 illustrates one REG structure. In FIG. 17, D denotes a resource element (RE) to which DCI is mapped, and R denotes an RE to which DMRS is mapped. DMRS is mapped to RE #1, RE #5, and RE #9 in the frequency domain direction within one symbol.

The PDCCH is transmitted through a Control Resource Set (CORESET). CORESET is defined as a REG set having a given numerology (e.g., SCS, CP length, etc.). A plurality of CORESETs for one UE may overlap in the time/frequency domain. CORESET may be configured through system information (e.g., MIB) or UE-specific higher layer (e.g., Radio Resource Control, RRC, layer) signaling. Specifically, the number of RBs and the number of symbols (maximum 3) constituting a CORESET may be configured by a higher layer signaling.

The precoder granularity in the frequency domain for each CORESET is configured as one of the followings by a higher layer signaling:

sameAsREG-bundle: same as REG bundle size in frequency domain allContiguousRBs: equal to the number of contiguous RBs in the frequency domain within a CORESET REGs in a CORESET are numbered based on a time-first mapping manner. That is, REGs are sequentially numbered from 0, starting from the first OFDM symbol in the lowest-numbered resource block within the CORESET.

Figure 18:
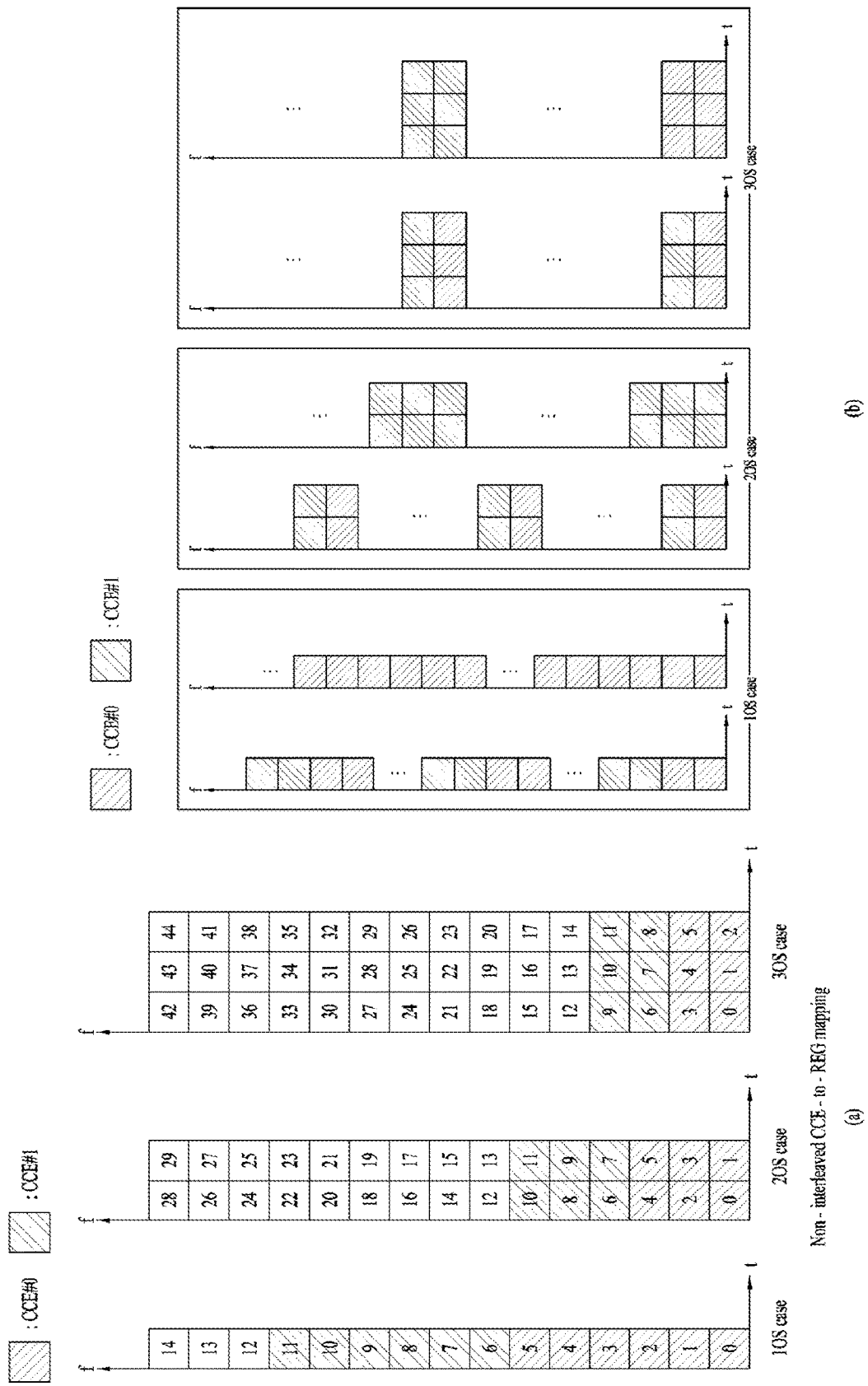

The type of mapping from CCE to REG is configured as one of a non-interleaved CCE-REG mapping type or an interleaved CCE-REG mapping type. FIG. 18(a) illustrates a non-interleaved CCE-REG mapping type, and FIG. 18(b) illustrates an interleaved CCE-REG mapping type.

Figure 19:
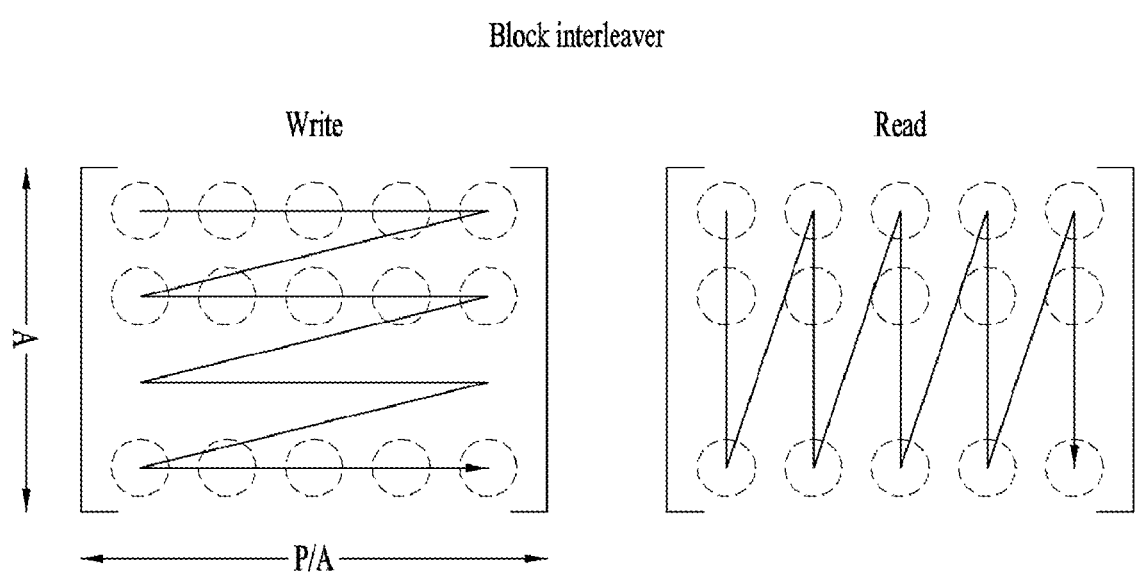

Non-interleaved CCE-REG mapping type (or localized mapping type): 6 REGs for a given CCE constitute one REG bundle, and all REGs for a given CCE are contiguous. One REG bundle corresponds to one CCE Interleaved CCE-REG mapping type (or Distributed mapping type): 2, 3 or 6 REGs for a given CCE constitute one REG bundle, and the REG bundle is interleaved within a CORESET. Within a CORESET consisting of 1 OFDM symbol or 2 OFDM symbols, a REG bundle consists of 2 or 6 REGs, and within a CORESET consisting of 3 OFDM symbols, a REG bundle consists of 3 or 6 REGs. REG bundle size is configured per CORESET FIG. 19 illustrates a block interleaver. The number of rows (A) of the (block) interleaver for the above interleaving operation is configured as one of 2, 3, or 6. When the number of interleaving units for a given CORESET is P, the number of columns of the block interleaver is equal to P/A. Writing operation on the block interleaver is performed in a row-first direction as shown in FIG. 19, and reading operation is performed in a column-first direction. Cyclic shift (CS) of the interleaving unit is applied based on an ID that may be configured independently from an ID that may be configured for DMRS.

The UE obtains DCI transmitted through the PDCCH by performing decoding (known as blind decoding) on the set of PDCCH candidates. A set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling. Each CORESET configuration is associated with one or more search space sets, and each search space set is associated with one CORESET configuration. One search space set is determined based on the following parameters.

controlResourceSetId: indicates the control resource set associated with the search space set monitoringSlotPeriodicityAndOffset: indicates the PDCCH monitoring periodicity duration (in units of slot) and the PDCCH monitoring duration offset (in units of slot)

monitoringSymbolsWithinSlot: indicates a PDCCH monitoring pattern within a slot for PDCCH monitoring (e.g., indicates the first symbol(s) of a control resource set)

nrofCandidates: indicates the number of PDCCH candidates (one value among 0, 1, 2, 3, 4, 5, 6, 8) per AL={1, 2, 4, 8, 16}

Table 6 exemplifies the characteristics of each search space type.

TABLE 6

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 7 exemplifies DCI formats transmitted through the PDCCH.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or Code Block Group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 may be used to deliver dynamic slot format information (e.g., dynamic SFI) to a UE, and DCI format 2_1 may be used to deliver downlink pre-emption information to a UE. DCI format 2_0 and/or DCI format 2_1 may be delivered to UEs in a group through a group common PDCCH which is a PDCCH delivered to UEs defined as one group.

Unlicensed Band/Shared Spectrum System

Figure 20:
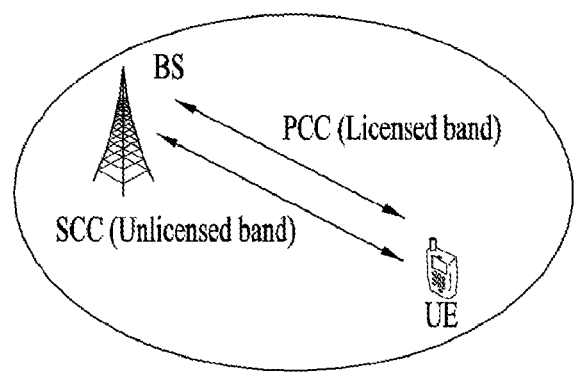
FIGS. 20 to 22 are diagrams for explaining channel transmission in an unlicensed band.
Figure 20:
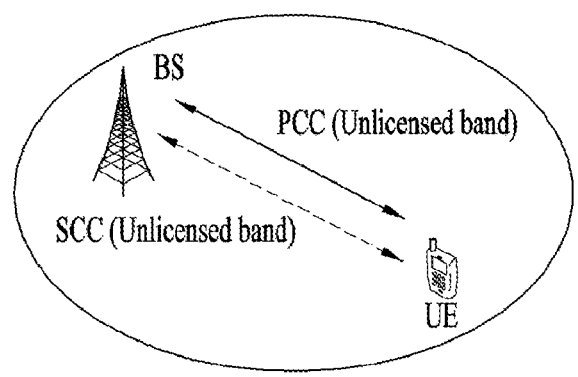

FIG. 20 is a diagram illustrating an example of a wireless communication system supporting an unlicensed band to which various embodiments of the present disclosure are applicable.

In the following description, a cell operating in a licensed band (hereinafter, L-band) is defined as an L-cell, and a carrier of the L-cell is defined as a (DL/UL) LCC. In addition, a cell operating in an unlicensed band (hereinafter, U-band) is defined as a U-cell, and a carrier of the U-cell is defined as (DL/UL) UCC. The carrier/carrier-frequency of the cell may refer to an operating frequency (e.g., center frequency) of the cell. A cell/carrier (e.g., CC) may be referred to as a cell.

As shown in FIG. 20(a), when a UE and a base station transmit and receive signals through the carrier-aggregated LCC and UCC, LCC may be set as Primary CC (PCC) and UCC may be set as Secondary CC (SCC).

As shown in FIG. 20(b), a UE and a base station may transmit and receive signals through one UCC or a plurality of carrier-aggregated LCC and UCC. That is, the UE and the base station may transmit and receive signals through only UCC(s) without LCC. Hereinafter, a signal transmission/reception operation in an unlicensed band described in various embodiments of the present disclosure may be performed (unless otherwise described) based on all the above-described deployment scenarios.

1. Radio Frame Structure for Unlicensed Band

For operation in the unlicensed band, the frame structure type 3 of LTE or NR frame structure may be used. The configuration of OFDM symbols occupied for uplink/downlink signal transmission in the frame structure for the unlicensed band may be configured by the base station. Here, the OFDM symbol may be replaced with an SC-FDM (A) symbol.

For downlink signal transmission through the unlicensed band, the base station may inform the UE of the configuration of OFDM symbols used in subframe #n through signaling. In the following description, a subframe may be replaced with a slot or a time unit (TU).

Specifically, in the case of a wireless communication system supporting the unlicensed band, the UE may assume (or identify) the configuration of the OFDM symbols occupied in subframe #n based on a specific field (e.g., Subframe configuration for LAA field, etc.) in DCI received from the base station in subframe #n−1 or subframe #n.

Table 8 exemplifies a method of indicating a configuration of OFDM symbols used for transmission of a downlink physical channel and/or a physical signal in the current subframe and/or the next subframe by the Subframe configuration for LAA field in the wireless communication system.

TABLE 8

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |

TABLE 8-continued

| Value of 'Subframe configuration for LAA' field in current subframe | Configuration of occupied OFDM symbols (current subframe, next subframe) |
|---|---|
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, — |
| 1101 | (3, —) |
| 1110 | reserved |
| 1111 | reserved |

NOTE:
- (—, Y) means UE may assume the first Y symbols are occupied in next subframe and other symbols in the next subframe are not occupied.
- (X, —) means UE may assume the first X symbols are occupied in current subframe and other symbols in the current subframe are not occupied.
- (X, *) means UE may assume the first X symbols are occupied in current subframe, and at least the first OFDM symbol of the next subframe is not occupied.

For uplink signal transmission through the unlicensed band, the base station may inform the UE of information about the uplink transmission duration through signaling.

Specifically, in the case of LTE system supporting an unlicensed band, the UE may obtain 'UL duration' and 'UL offset' information for subframe #n through the 'UL duration and offset' field in the detected DCI.

Table 9 exemplifies a method in which the UL duration and offset field indicates UL offset and UL duration configurations in a wireless communication system.

TABLE 9

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

2. General Channel Access Procedure

The following definitions may be applied to terminologies used in the description of various embodiments of the present disclosure to be described later, unless otherwise described.

A channel may mean a carrier or a part of a carrier consisting of a continuous set of RBs on which a channel access procedure is performed in a shared spectrum.

A channel access procedure may be a sensing-based procedure for evaluating the availability of a channel for performing transmission. The basic unit of sensing may be a sensing slot having a duration of Tsl=9 us. When the base station or UE senses a channel during the sensing slot duration and determines that the detected power sensed for at least 4 us within the sensing slot duration is less than an energy detection threshold XThresh, the sensing slot duration Tsl may be considered as idle. Otherwise, the sensing slot duration Tsl may be considered busy.

Channel occupancy may mean transmission in a channel by a base station/UE after performing the channel access procedure corresponding to the present section.

Channel occupancy time may mean the total time during which a base station/UE and any base station/UE(s) sharing the channel occupancy performs transmission in the channel, after the base station/UE performs the channel access procedure corresponding to the present section. In order to determine the channel occupancy time, if the transmission gap is 25 us or less, the gap duration may be counted as the channel occupancy time. The channel occupancy time may be shared for transmission between the base station and the corresponding UE(s).

3. Downlink Channel Access Procedure

The base station may perform the following downlink channel access procedure (Channel Access Procedure; CAP) for the unlicensed band for downlink signal transmission in the unlicensed band.

3.1. Type 1 Downlink (DL) Channel Access Procedures

In this section, a channel access procedure performed from a base station will be described, based on a time duration spanned by a sensing slot sensed as idle before downlink transmission(s) being random. This section may apply to the following transmissions:

Transmission(s) initiated by a base station including PDSCH/PDCCH/EPDCCH, or,

Transmission(s) initiated by a base station including unicast PDSCH with user plane data, or unicast PDSCH with user plane data and unicast PDCCH scheduling user plane data, or Transmission(s) initiated by the base station, with only a discovery burst, or with a discovery burst multiplexed with non-unicast information. Here, the transmission duration may be greater than 1 ms or the transmission may cause the discovery burst duty cycle to exceed 1/20.

The base station senses whether a channel is in an idle state during a sensing slot duration of a defer duration Td, and after the counter N becomes 0 in the following step 4, the transmission may be transmitted. In this case, the counter N is adjusted by channel sensing for an additional sensing slot duration according to the following procedure:

1) Set $N=N_{init}$. Here, $N_{init}$ is a random number uniformly distributed between 0 and $CW_p$. Then proceed to step 4.

2) If N>0 and the base station selects to decrement the counter, set N=N−1.

3) A channel is sensed for an additional sensing slot duration. Here, if the additional sensing slot duration is idle, the process moves to step 4. If not, proceed to step 5.
4) If N=0, the corresponding procedure is stopped. Otherwise, proceed to step 2.
5) Sensing the channel until a busy sensing slot is detected within the additional defer duration $T_d$ or all sensing slots of the additional defer duration $T_d$ are detected as idle.
6) If the corresponding channel is sensed as idle during all sensing slot durations of the additional defer duration $T_d$, the process moves to step 4. Otherwise, proceed to step 5.

Figure 21:
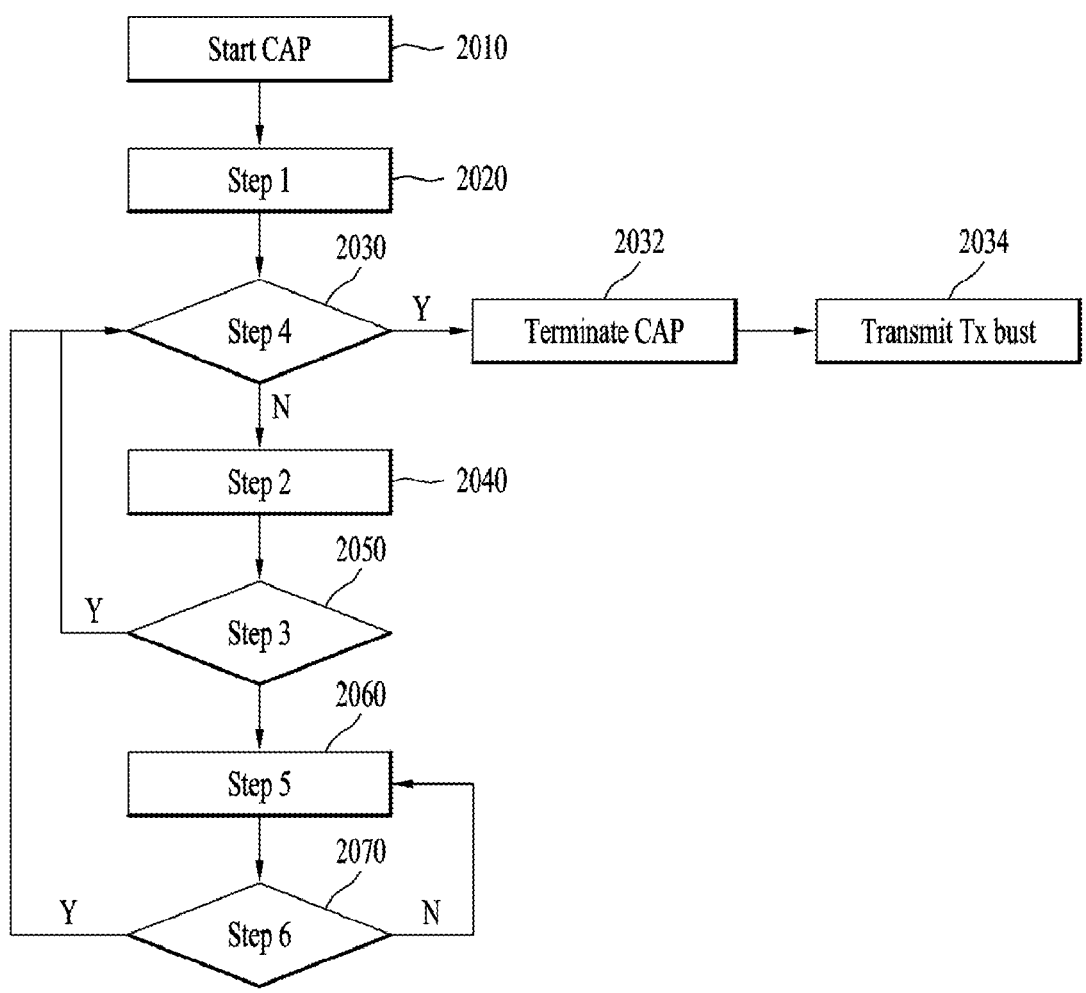

FIG. 21 is a diagram for explaining a DL CAP for unlicensed band transmission to which various embodiments of the present disclosure are applicable.

A type 1 downlink channel access procedure for unlicensed band transmission to which various embodiments of the present disclosure are applicable may be summarized as follows.

For downlink transmission, a transmitting node (e.g., a base station) may initiate a channel access procedure (CAP) (2010).

The base station may randomly select the backoff counter N within the contention window (CW) according to step 1. Here, the value of N is set to the initial value Ninit (2020). Ninit is selected to be any value between 0 and CWp.

Next, if the backoff counter value (N) is 0 according to step 4 (2030; Y), the base station ends the CAP process (2032). Then, the base station may perform Tx burst transmission (2034). Meanwhile, if the backoff counter value is not 0 (2030; N), the base station decreases the backoff counter value by 1 according to step 2 (2040).

Next, the base station checks whether the channel is in an idle state (2050), and if the channel is in an idle state (2050; Y), checks whether the backoff counter value is 0 (2030).

Meanwhile, in operation of 2050, if the channel is not in an idle state, that is, if the channel is in a busy state (2050; N), the base station checked whether the corresponding channel is idle state (2060) during a defer duration (Td; 25 usec or more) longer than the sensing slot time (e.g., 9 usec) according to step 5. If the channel is in an idle state during the defer duration (2070; Y), the base station may resume the CAP process again.

For example, when the backoff counter value Ninit is 10 and the channel is determined to be in a busy state after the backoff counter value is decreased to 5, the base station senses the channel during the defer duration to determine whether it is in an idle state. Here, if the channel is in an idle state during the defer duratino, the base station does not set the backoff counter value Ninit, but performs the CAP process again from the backoff counter value 5 (or from 4 after decreasing the backoff counter value by 1)

Meanwhile, if the channel is in a busy state during the defer duration (2070; N), the base station re-performs step 2060 to check again whether the channel is idle for the new delay period.

In case that the base station does not transmit a transmission after step 4 in the above procedure, the base station may transmit a transmission on the channel if the following conditions are satisfied:

The base station is prepared to transmit a transmission and the corresponding channel is sensed as idle for at least the sensing slot duration Tsl, and the channel is sensed as idle for all sensing slot durations of the defer duration Td immediately before the transmission Meanwhile, when the base station senses the channel after being prepared for transmission, the channel is not sensed as idle during the sensing slot duration Tsl, or when the channel is not sensed as idle during any one sensing slot duration in the defer duration Td immediately before the intended transmission, the base station proceeds to step 1 after sensing that the channel is idle during the sensing slot duration of the defer duration Td.

The defer duration Td consists of a period Tf (=16 us) immediately following the mp consecutive sensing slot durations. Here, each sensing slot duration Tsl is 9 us, and Tf includes an idle sensing slot duration Tsl at the starting point of Tf.

Table 10 exemplifies that mp, minimum CW, maximum CW, Maximum Channel Occupancy Time (MCOT) and allowed CW sizes applied to the CAP vary according to the channel access priority class.

TABLE 10

| Channel Access Priority Class (p) | $m_p$ | $CW_{min,p}$ | $CW_{max,p}$ | $T_{m\,cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

3.2. Type 2 Downlink (DL) Channel Access Procedures 3.2.1. Type 2A DL Channel Access Procedure The base station may transmit a transmission immediately after the corresponding channel is sensed as idle for at least the sensing duration Tshort dl=25 us. Here, Tshort dl consists of a duration Tf (=16 us) immediately following one sensing slot duration. Tf includes a sensing slot at the starting point of Tf. When two sensing slots in the Tshort dl are sensed as idle, the channel is considered to be idle during Tshort dl.

3.2.2. Type 2B DL Channel Access Procedure

The base station may transmit a transmission immediately after the corresponding channel is sensed as idle for Tf=16 us. Tf includes sensing slot occurring within the last 9 us of Tf. If the channel is sensed to be idle for at least 5 us in total with at least 4 us sensing occurring in the sensing slot, the channel is considered to eb idle during Tf.

3.2.3. Type 2C DL Channel Access Procedure

When the base station follows the procedure of this section to transmit a transmission, the base station does not sense the channel before transmitting the transmission. The duration corresponding to the transmission is up to 584 us.

4. Channel Access Procedure for Transmission(s) on Multiple Channels

A base station may access multiple channels through which transmission is performed through one of the following Type A or Type B procedures.

4.1. Type A Multi-Carrier Access Procedures

According to the procedure disclosed in this section, the base station performs channel access on each channel $c_i \in C$. Here, C is a set of channels that the base station intends to transmit, i=0, 1, ... q−1, and q is the number of channels that the base station intends to transmit.

The counter N considered in the CAP is determined for each channel ci, and in this case, the counter for each channel is denoted by $Nc_i$.

4.1.1. Type A1 Multi-Channel Access Procedure

A counter N considered in the CAP is determined for each channel $c_i$, and a counter for each channel is denoted by $Nc_i$.

If the base station ceases a transmission on any one channel $c_j \in C$, if the absence of other technology sharing the channel can be guaranteed on a long term basis (e.g., by level of regulation), for each channel $c_i$ (here, $c_i$ is different from $c_j$, $c_i \in C$), after waiting for the interval of $4 \cdot T_{sl}$, when an idle sensing slot is detected after reinitializing the $Nc_i$, the base station may resume decrement of $Nc_i$.

4.1.2. Type A2 Multi-Channel Access Procedure

The counter N for each channel $c_j \in C$ may be determined according to the above-described descriptions, and in this case, the counter for each channel is denoted by $Nc_j$. Here, $c_j$ may mean a channel having the largest $CW_p$ value. For each channel $c_j$, it may be configured as $Nc_i = Nc_j$.

When the base station ceases the transmission for any one of the channels to which $Nc_i$ is determined, the base station reinitialises $Nc_i$ for all channels.

4.2. Type B Multi-Channel Access Procedure

A channel $c_j \in C$ may be selected by the base station as follows.

The base station uniformly randomly selects $c_j$ from the C prior to each transmission on the multi-channel $c_j \in C$, or, The base station does not select more than or equal to once every 1 second.

Here, C is a set of channels that the base station intends to transmit, $i=0, 1, \ldots q-1$, and q is the number of channels that the base station intends to transmit.

For transmission on a channel $c_j$, the base station performs channel access on the channel $c_j$ according to the dedication described in the above section 4.2.1 or the section 4.2.2 together with the procedure described in the section 3.1.

For a transmission on a channel $c_i \neq c_j$, Among channels $c_j \in C$,

For each channel ci, the base station senses the channel $c_i$ for at least a sensing interval $T_{mc} = 28$ us immediately before a transmission on the channel $c_j$. Then, the base station may perform transmission on the channel $c_i$ immediately after sensing that the channel $c_j$ is idle for at least the sensing interval. When the channel is sensed as idle for all time intervals during which idle sensing is performed on a channel $c_j$ within a given interval $T_{mc}$, the channel $c_j$ may be considered as idle for $T_{mc}$.

The base station does not perform transmission for a period exceeding $T_{mcot,p}$ of the above Table 10 on the channel $c_i \neq c_j$ (here, $c_i \in C$). Here, $T_{mcot,p}$ is determined using the channel access parameter used for the channel $c_j$.

In the procedure of this section, the channel frequency of the channel set C selected by the gNB is a subset of one of the predefined channel frequency sets.

4.2.1. Type B1 Multi-Channel Access Procedure

A single $CW_p$ value is maintained for channel set C.

In order to determine the $CW_p$ for the channel access on the channel $c_j$, step 2 of the procedure described above in section 3.1 above is modified as follows.

When at least $Z=80\%$ of HARQ-ACK values corresponding to PDSCH transmission(s) in the reference subframe k of all channels $c_j \in C$ are determined as NACK, increment $CW_p$ for all priority classes $p \in \{1, 2, 3, 4\}$ to the next higher allowed value. Otherwise, proceed to step 1.

4.2.2. Type B2 Multi-Channel Access Procedure

The $CW_p$ value is maintained independently for each channel $c_p \in C$. In order to determine the $CW_p$ for the channel $c_i$, any PDSCH that completely or partially overlaps the channel $c_i$ may be used. To determine the $N_{init}$ for the channel $c_j$, the $CW_p$ value of the channel $c_{j1} \in C$ is used. Here, $c_{j1}$ is the channel with the largest $CW_p$ among all channels in the set C.

5. Uplink Channel Access Procedures

A UE and a base station scheduling or configuring UL transmission for the UE performs the following procedure for access to a channel (performing LAA Scell transmission(s)). In the following description, an uplink CAP operation to which various embodiments of the present disclosure applicable will be described in detail on the assumption that Pcell, which is a licensed band, and Scell, which is one or more unlicensed bands are basically configured for the UE and the base station. However, the uplink CAP operation may be analogously applied to the case that only unlicensed band is configured for the UE and the base station.

A UE may access according to a Type 1 or Type 2 UL channel access procedure on a channel on which UL transmission(s) is performed.

Table 11 exemplifies that mp, minimum CW, maximum CW, Maximum Channel Occupancy Time (MCOT) and allowed CW sizes applied to the CAP vary according to the channel access priority classes.

TABLE 11

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

5.1. Type 1 UL Channel Access Procedure

This section describes a channel access procedure performed from the UE in which a time duration spanned by a sensing slot sensed as idle before uplink transmission(s) is random. This section may apply to the following transmissions:

PUSCH/SRS transmission(s) scheduled and/or configured from the base station

PUCCH transmission(s) scheduled and/or configured from the base station random access procedure (RAP) related transmission(s)

Figure 22:
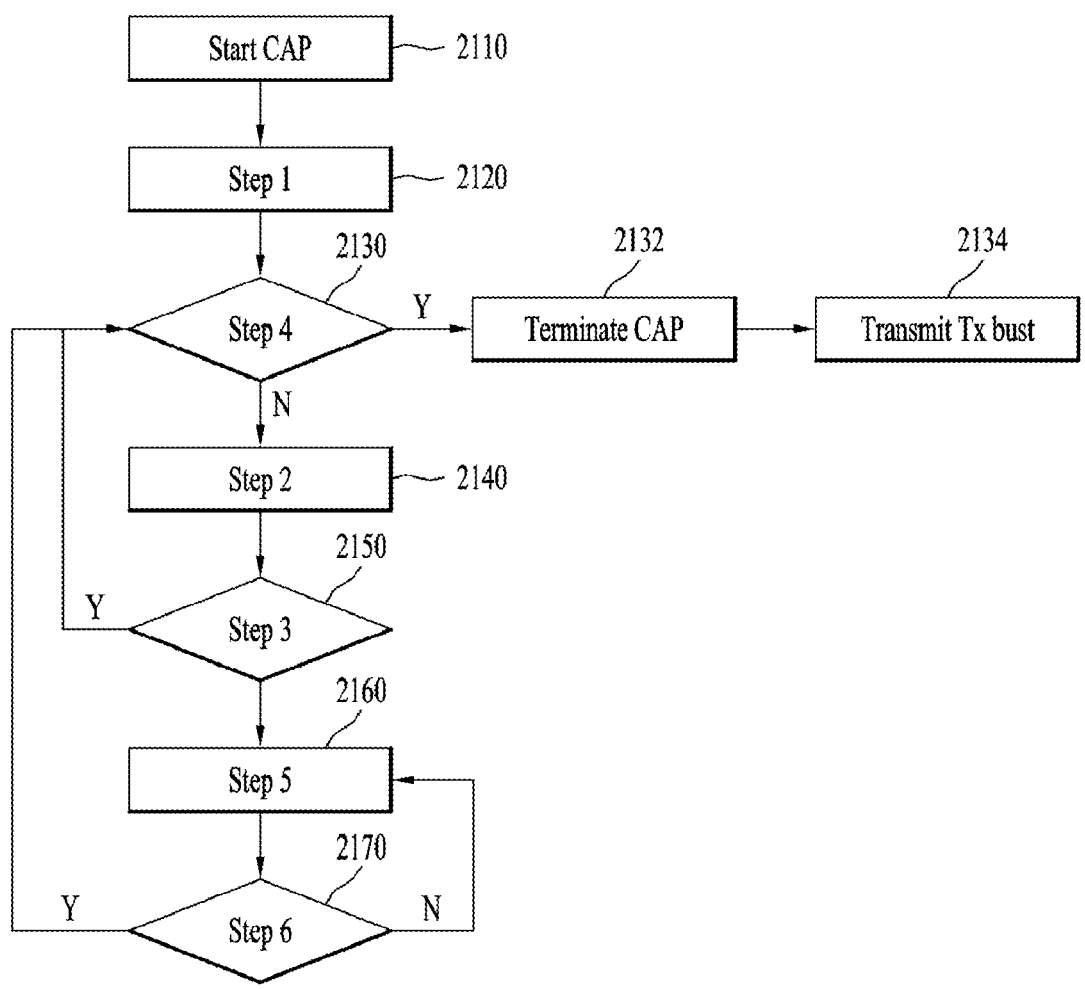

FIG. 22 is a diagram for explaining a UL CAP for unlicensed band transmission to which various embodiments of the present disclosure are applicable.

The type 1 UL CAP of the UE for unlicensed band transmission to which various embodiments of the present disclosure are applicable may be summarized as follows.

For uplink transmission, a transmitting node (e.g., UE) may initiate a channel access procedure (CAP) to operate in an unlicensed band (2110).

The UE may randomly select a backoff counter N within the contention window (CW) according to step 1. Here, the value of N is set to the initial value Ninit (2120). Ninit is selected to be any value between 0 and CWp.

Next, if the backoff counter value (N) is 0 according to step 4 (2130; Y), the UE terminates the CAP process (2132). The UE may then perform a Tx burst transmission (2134). Meanwhile, if the backoff counter value is not 0 (2130; N), the UE decreases the backoff counter value by 1 according to step 2 (2140).

Next, the UE checks whether the channel is in an idle state (2150), and if the channel is in an idle state (2150; Y), checks whether the backoff counter value is 0 (2130).

Meanwhile, in operation 2150, if the channel is not in an idle state, that is, if the channel is in a busy state (2150; N), the UE checks whether the corresponding channel is in an idle state (2160) for a defer duration (Td; 25 usec or more) longer than the slot time (e.g., 9 usec) according to step 5. If the channel is in an idle state during the defer duration (2170; Y), the UE may resume the CAP process again.

For example, when the backoff counter value Ninit is 10 and the channel is determined to be in a busy state after the backoff counter value is decreased to 5, the UE senses the channel during the defer duration to determine whether it is in an idle state. Here, if the channel is in an idle state during the defer duration, the UE does not set the backoff counter value Ninit, but may perform the CAP process again from the backoff counter value 5 (or from 4 after decrementing the backoff counter value by 1).

Meanwhile, if the channel is busy during the delay period (2170; N), the UE re-performs operation 2160 to check again whether the channel is in an idle state during the new defer duration.

In the above procedure, if the UE does not transmit UL transmission on a channel on which transmission(s) is performed after step 4 of the above-described procedure, the UE may transmit UL transmission on the channel if the following condition is satisfied UE is ready to perform transmission and the corresponding channel is sensed as idle at least within the sensing slot duration Tsl, and the channel is sensed as idle during all slot durations of defer duration Td immediately before the transmission Meanwhile, if the channel is not sensed as idle within a sensing slot duration Tsl when the UE first senses the channel after it is ready to perform transmission, or if the corresponding channel is not sensed as idle during any sensing slot duration of the defer duration Td immediately before the intended transmission, the UE proceeds to step 1 after sensing the corresponding channel as idle during the slot durations of the defer duration Td.

The defer duration Td consists of a period Tf (=16 us) immediately following mp consecutive slot dudrations. Here, each slot duration Tsl is 9 us, and Tf includes an idle slot duration Tsl at the starting point of Tf.

5.2. Type 2 UL Channel Access Procedure 5.2.1 Type 2A UL Channel Access Procedure If the UE is instructed to perform the Type 2A UL channel access procedure, the UE uses the Type 2A channel access procedure for UL transmission. The UE may transmit transmission immediately after sensing that the channel is idle for at least a sensing duration $T_{short\_ul}$=25 uS. $T_{short\_ul}$ consists of one sensing slot duration $T_{sl}$=9 us immediately followed by a duration $T_f$=16 us. $T_f$ includes a sensing slot at the starting point of the $T_f$. If two sensing slots in the $T_{short\_ul}$ are sensed as idle, the channel is considered as idle during $T_{short\_ul}$.

5.2.2. Type 2B UL Channel Access Procedure

If the UE is instructed to perform a Type 2B UL channel access procedure, the UE uses the Type 2B channel access procedure for UL transmission. The UE may transmit transmission immediately after the corresponding channel is sensed as idle for Tf=16 us. Tf includes sensing slots occurring within the last 9 us of Tf. If the channel is sensed to be idle for at least 5 us in total with at least 4 us sensing occurring in the sensing slot, the channel is considered idle during Tf.

5.2.3. Type 2C UL Channel Access Procedure

If the UE is instructed to perform the Type 2C UL channel access procedure, the UE does not sense the channel before transmitting the transmission in order to transmit the transmission. The duration corresponding to that transmission is up to 584 us.

6. Channel Access Procedure for UL Multi-Channel Transmission(s) for UL Multi-Channel Transmission(s)

If the UE:

is scheduled to transmit on a set of channels C, if the UL scheduling grant for UL transmission on channel set C indicates a Type 1 channel access procedure, if UL transmissions are scheduled to start transmission at the same time for all channels in the set of channels C, and/or intends to perform uplink transmission on resources configured on channel set C using a type 1 channel access procedure, and If the channel frequencies of channel set C are a subset of one of the preconfigured channel frequency sets:

UE may perform transmission on a channel $c_i \in C$ using a Type 2 channel access procedure.

if the type 2 channel access procedure was performed on the channel $c_i$ immediately before UE transmission on the channel $c_j \in C$ (here, i≠j), and if the UE has accessed channel $c_j$ using Type 1 channel access procedure, Prior to performing the Type 1 channel access procedure on any one channel in the set of channels C, the channel $c_j$ is selected uniformly randomly from the channel set C by the UE.

if the UE fails to access any one channel, the UE may not transmit in a channel $c_i \in C$ within the bandwidth of the carrier of the carrier bandwidth that is scheduled or configured by UL resources.

Random Access (RA) Procedure

Figure 23:
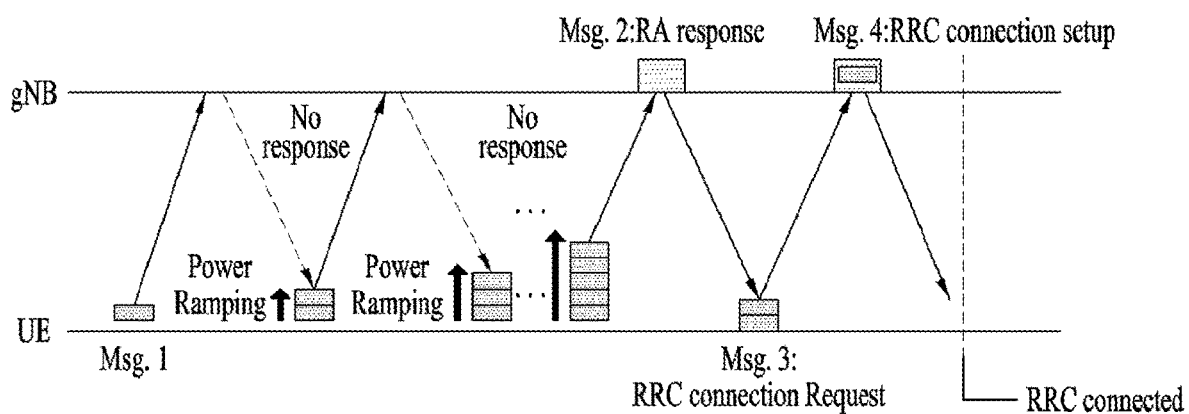
FIG. 23 is a diagram illustrating an example of a random access procedure.

FIG. 23 illustrates an example of a random access procedure. In particular, FIG. 23 illustrates a contention-based random access procedure.

First, the UE may transmit the random access preamble as Msg1 of the random access procedure in the UL through the PRACH.

Random access preamble sequences having two different lengths are supported. The long sequence length 839 applies for subcarrier spacings of 1.25 and 5 kHz, and the short sequence length 139 applies for subcarrier spacings of 15, 30, 60 and 120 kHz.

Multiple preamble formats are defined by one or more RACH OFDM symbols and a different cyclic prefix (and/or guard time). The RACH configuration regarding the initial bandwidth of the Primary Cell (Pcell) is included in the system information of the cell and provided to the UE. The RACH configuration includes information about a subcarrier spacing of a PRACH, available preambles, a preamble format, etc. The RACH configuration includes association information between SSBs and RACH (time-frequency) resources. The UE transmits a random access preamble in the RACH time-frequency resource associated with the detected or selected SSB.

A threshold value of the SSB for RACH resource association may be configured by the network, and transmission or retransmission of the RACH preamble is performed based on the SSB in which the measured reference signal received power (RSRP) satisfies the threshold based on the SSB. For example, the UE may select one of the SSB(s) that satisfies the threshold, and transmit or retransmit the RACH preamble based on the RACH resource associated with the selected SSB. For example, upon retransmission of the RACH preamble, the UE may reselect one of the SSB(s) and retransmit the RACH preamble based on the RACH resource associated with the reselected SSB. That is, the RACH resource for retransmission of the RACH preamble may be the same as and/or different from the RACH resource for transmitting the RACH preamble.

When the base station (BS) receives the random access preamble from the UE, the BS transmits a random access response (RAR) message (Msg2) to the UE. The PDCCH scheduling the PDSCH carrying the RAR is CRC scrambled with a random access (RA) radio network temporary identifier (RNTI) (RA-RNTI) and transmitted. The UE detecting the PDCCH that is CRC scrambled with the RA-RNTI may receive the RAR from the PDSCH scheduled by the DCI carried by the PDCCH. The UE checks whether the random access response information for the preamble, that is, Msg1, transmitted by the UE itself is in the RAR. Whether or not random access information for Msg1 transmitted by UE itself exists may be determined by whether a random access preamble ID for the preamble transmitted by the UE exists. If there is no response to Msg1, the UE may retransmit the RACH preamble within a predetermined number of times while performing power ramping. The UE calculates the PRACH transmit power for the retransmission of the preamble based on the most recent transmit power, the amount of power increment and the power ramping counter.

Random access response information includes a preamble sequence transmitted by the UE, a temporary cell-RNTI (TC-RNTI) assigned by the base station to a UE that has attempted random access, and uplink transmission time alignment information, uplink transmission power adjustment information, and uplink radio resource allocation information. When the UE receives random access response information for itself on the PDSCH, the UE may know timing advance information for UL synchronization, an initial UL grant, and a TC-RNTI. The timing advance information is used to control uplink signal transmission timing. In order for the PUSCH/PUCCH transmission by the UE to be better aligned with the subframe timing at the network end, the network (e.g., BS) obtains timing advance information based on the timing information detected from the PRACH preamble received from the UE, and may send the corresponding timing advance information to the UE. The UE may transmit UL transmission on the uplink shared channel as Msg3 of the random access procedure based on the random access response information. Msg3 may include an RRC connection request and UE identifier. As a response to Msg3, the network may send Msg4, which may be treated as a contention resolution message on DL. By receiving Msg4, the UE may enter the RRC connected state.

Meanwhile, a contention-free random access procedure may be used when the UE is in the process of handover to another cell or BS, or be performed when requested by a command of the BS. The basic procedure of the contention-free random access procedure is similar to the contention-based random access procedure. However, unlike the contention-based random access procedure in which the UE randomly selects a preamble to be used from among a plurality of random access preambles, in the case of the contention-free random access procedure, the preamble (hereinafter, dedicated random access preamble) to be used by the UE is determined by the BS and assigned to the UE. Information on the dedicated random access preamble may be included in an RRC message (e.g., a handover command) or may be provided to the UE through a PDCCH order. When the random access procedure is initiated, the UE transmits a dedicated random access preamble to the BS. When the UE receives the random access response from the BS, the random access procedure is completed.

As mentioned above, the UL grant in the RAR schedules PUSCH transmission to the UE. The PUSCH carrying the initial UL transmission by the UL grant in the RAR is also referred to as Msg3 PUSCH. The content of the RAR UL grant starts at the MSB and ends at the LSB, and is given in Table 12.

TABLE 12

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

TPC command is used to determine the transmit power of the Msg3 PUSCH, and is interpreted according to, for example, Table 13.

TABLE 13

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE includes the aperiodic CSI report in the corresponding PUSCH transmission. The subcarrier spacing for Msg3 PUSCH transmission is provided by the RRC parameter. UE will transmit PRACH and Msg3 PUSCH on the same uplink carrier of the same serving cell. The UL BWP for Msg3 PUSCH transmission is indicated by System Information Block1 (SIB1).

Prior to the detailed description, an example of the operation of a UE and the base station according to embodiments of the present disclosure will be described with reference to FIGS. 24 to 25.

Figure 24:
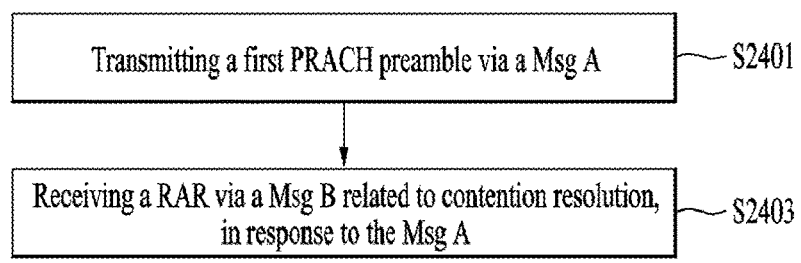
FIGS. 24 to 25 are diagrams for explaining a specific operation implementation example of a terminal and a base station according to embodiments of the present disclosure.

FIG. 24 is a diagram for explaining an example of an operation implementation of a UE according to the present disclosure. Referring to FIG. 24, a UE may transmit a first Physical Random Access Channel (PRACH) preamble through message A (S2401). And in response to the message A, a random access response (RAR) may be received through the message B related to contention resolution (S2403). Here, a specific method for the UE in S2401 to S2403 to perform the random access procedure may be based on the embodiments and features to be described below.

Meanwhile, the UE of FIG. 24 may be any one of various wireless devices disclosed in FIGS. 31 to 34. For example, the UE of FIG. 24 may be the first wireless device 100 of FIG. 31 or the wireless devices 100 and 200 of FIG. 32. In other words, the operation process of FIG. 24 may be performed and executed by any one of various wireless devices illustrated in FIGS. 31 to 34.

Figure 25:
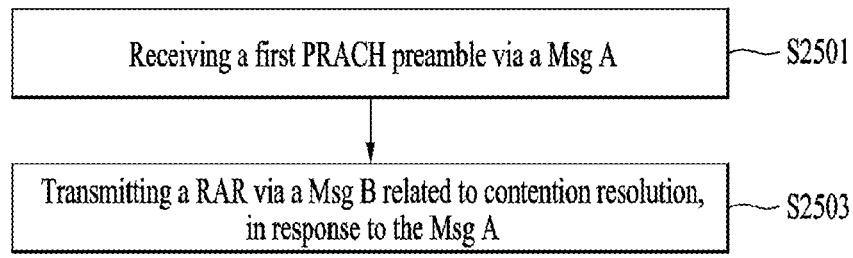

FIG. 25 is a diagram for explaining an example of an operation implementation of a base station according to the present disclosure. FIG. 25, the base station may receive the first Physical Random Access Channel (PRACH) preamble through message A (S2501), and in response to the message A, Random Access Response (RAR) may be transmitted through message B related to contention resolution (S2503). Here, a specific method for the base station in S2501 to S2503 to perform the random access procedure may be based on the embodiments and features described below.

Meanwhile, the base station of FIG. 25 may be any one of various wireless devices disclosed in FIGS. 31 to 34. For example, the base station of FIG. 25 may be the second wireless device 200 of FIG. 31 or the wireless devices 100 and 200 of FIG. 32. In other words, the operation process of FIG. 25 may be performed and executed by any one of the various wireless devices illustrated in FIGS. 31 to 34.

In LTE and/or NR systems, the UE may perform UL transmission through a random access procedure (RACH Procedure) without receiving a direct uplink (UL) transmission scheduling from a given base station or cell. From the UE's point of view, the random access process in LTE and/or the system is a 4-step procedure including: 1) transmission of a random access preamble, 2) reception of Message (Msg) 2 corresponding to a random access response (RAR), 3) transmission of Msg 3 including a Physical Uplink Shared Channel (PUSCH), 4) reception of Msg 4 including information on contention resolution.

Here, Msg 2 is a message for allocating, by a base station receiving a random preamble, UL resources to be used by the UE that has transmitted the corresponding preamble for transmitting Msg 3. Through Msg 3, the UE may transmit information related a connection request, etc. with its own identification information such as an international mobile subscriber identification number (International Mobile Subscriber Identity; IMSI) or a temporary mobile subscriber identification number (Temporary Mobile Subscriber Identity; TMSI). Upon receiving Msg 3, the base station may transmit, through Msg 4, identification information of the corresponding UE and information necessary for random access, thereby preventing collisions that may occur between different UEs during the random access procedure and completing the random access procedure for the corresponding UE.

Unlike the RACH Procedure in the existing LTE and NR Rel-15 that was configured in 4-step as described above, in the newly introduced NR Rel-16, a study on a 2-step RACH Procedure is in progress so that the processing delay by 4-step is simplified and the RACH procedure is utilized even in a small cell or an unlicensed bandwidth. In the 2-step RACH, the step of transmitting Message 3 (Msg 3) including a Physical Uplink Shared Channel (PUSCH) and the step of sending Msg 4 including a contention resolution message, etc. in the existing 4-step RACH were omitted. Instead, in the first step of the random access procedure, the UE directly transmits messages corresponding to the preamble together with Msg 3 as Msg A to the base station, and in response to Msg A, the base station transmits messages corresponding to RAR together with Msg 4 as Msg B to the UE. Upon receiving Msg B, the UE decodes Msg B and completes the random access procedure, and thereafter performs data transmission/reception.

Figure 26:
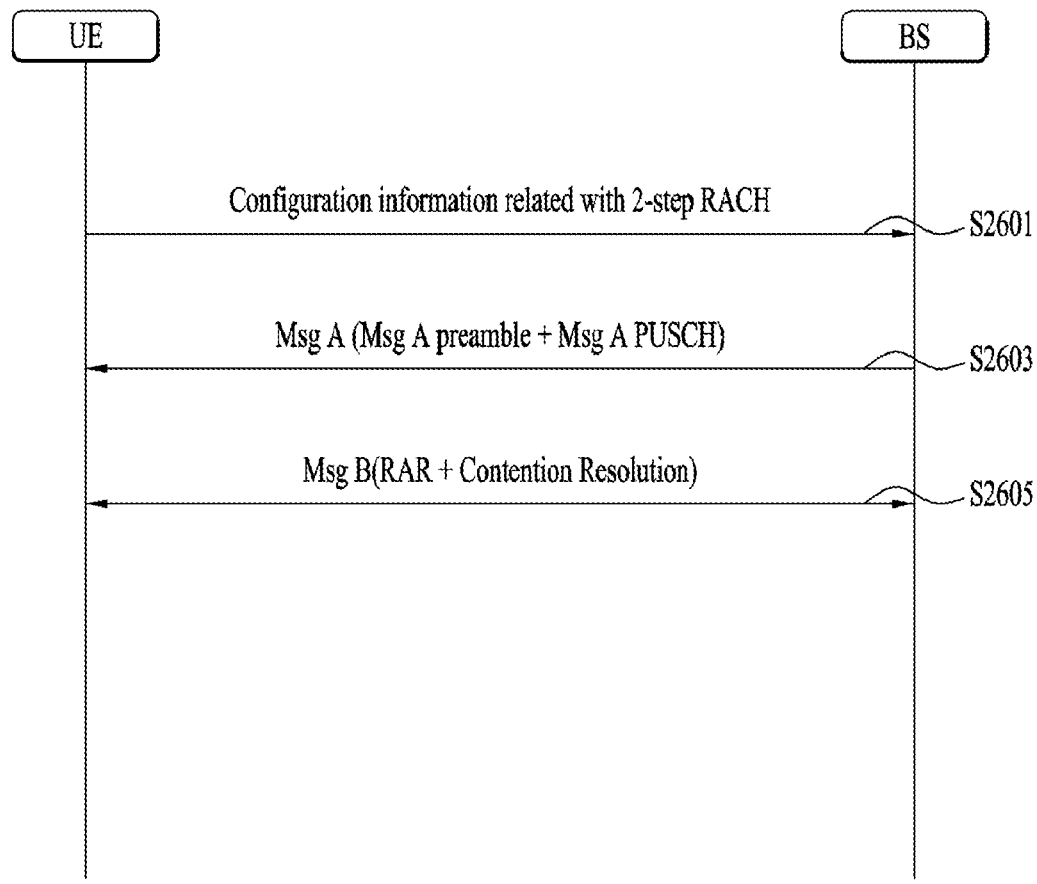
FIG. 26 is a diagram illustrating a basic process of a 2-step RACH.

FIG. 26 is a diagram illustrating a basic procedure of a 2-step RACH. Referring to FIG. 26, the UE may receive 2-step RACH-related configuration information included in broadcast system information from the base station (S2601). Upon receiving the 2-step RACH-related configuration information, the UE transmits Msg A including the RACH preamble (or PRACH preamble) and PUSCH based on the configuration information to perform a random access procedure for the base station (S2603). Here, the RACH preamble and the PUSCH may be transmitted at a predetermined interval in the time domain or may be transmitted continuously, and the corresponding PUSCH includes identifier (ID) information of the UE. The base station may detect the preamble, and may predict and receive the PUSCH at a corresponding gap or continuously. After receiving an access request and/or response from an upper layer based on the ID information of the UE transmitted through the PUSCH, the base station sends Msg B including information such as RAR and contention resolution as a response to Msg A to the UE (S2605). Thereafter, depending on whether the UE receives Msg B, the UE completes access to the base station in the same or similar manner as after the operation of receiving Msg 4 in the existing 4-step RACH procedure, and may transmit and receive data with the base station.

In NR, as the UE may perform the random access procedure in the unlicensed band, the Listen Before Talk (LBT) process required for signal transmission and reception on the unlicensed band may also be applied to the signal transmission and reception for the random access procedure. That is, in the NR-Unlicensed spectrum (NR-U) system, LBT is always performed to check the idle or busy state of the transmission/reception channel before the base station and the UE transmits/receives a signal, and the same may be performed in the procedure for transmitting and receiving Msg A and Msg B for a 2-step RACH procedure on the unlicensed band.

In particular, since the transmission of Msg A in the 2-step RACH procedure includes a transmission of the Msg A PRACH preamble together with a transmission of the Msg A PUSCH, depending on the success or the failure of LBT for the Msg A PUSCH after transmitting the Msg A PRACH preamble, the random access procedure performed thereafter may vary. For example, if the UE transmits the Msg A PRACH preamble and then successfully performs LBT for the Msg A PUSCH and transmits the Msg A PUSCH without any particular problem, the base station correctly receives both the Msg A PRACH preamble and the Msg A PUSCH, and transmits Msg B including contention resolution information to the UE, and a 2-step RACH procedure may be completed. Otherwise, if the UE fails LBT for the Msg A PUSCH after transmitting the Msg A PRACH preamble, the UE cannot transmit the Msg A PUSCH, and the base station that receives only the Msg A PRACH preamble and does not receive the Msg A PUSCH may indicate, through Msg B, a fall-back to Msg 3 is indicated, and the UE may switch to a 4-step RACH procedure.

Therefore, for the 2-step RACH procedure in the unlicensed band, whether a success or failure of LBT for Msg A PUSCH should be considered in Msg A PUSCH transmission and subsequent Msg B reception, and particularly, it may be necessary to avoid process delays that occur when LBT fails. Hereinafter, in order to maintain the advantage of fast access of the 2-step RACH procedure, a method of configuring single or multiple resources for Msg A PUSCH in consideration of LBT failure will be described, and a method of configuring a reception window (or contention resolution timer; CR timer) of Msg B according to the configured resource will be described.

1. Case that RACH Occasion and Msg a PUSCH Occasion have a One-to-One Mapping Relationship For the transmission of Msg A, the RACH Occasion (RO) in which the Msg A PRACH preamble is transmitted and the PUSCH Occasion (PO) in which the Msg A PUSCH is transmitted may be mapped one-to-one. Therefore, in case that the UE transmits the Msg A PRACH preamble, Msg A PUSCH Occasion corresponding to the transmitted Msg A PRACH preamble is configured as one, and whether the Msg A PUSCH is transmitted according to the success or failure of the LBT is determined for the one Msg A PUSCH Occasion.

The window or timer for the UE to receive Msg B may be configured as 1) if the LBT is successful, the window is configured or the timer starts after the Msg A PUSCH Occasion, or if the LBT fails, the window is not configured or the timer does not start. Alternatively, it may be configured as 2) regardless of success or failure of LBT, the window is always configured or the timer always starts after Msg A PUSCH Occasion.

Here, the UE selects the Msg A PRACH preamble for the 2-step RACH procedure, and even though the UE succeeds in the LBT for the Msg A PUSCH, or regardless of the success or failure of the LBT, in case that situation such as a deterioration in the channel status of said one Msg A PUSCH Occasion occur, the UE may predict the detection error probability for the Msg A PUSCH for itself and may transmit only the Msg A PRACH preamble and does not transmit the Msg A PUSCH. That is, whether the Msg A PUSCH is transmitted or not may vary depending on the success or failure of the LBT or depending on the independent determination and selection of the UE regarding transmission or non-transmission of Msg A PUSCH.

In a situation in which whether Msg A PUSCH is transmitted or not may be determined as described above, the start time of the window or the timer for receiving Msg B may be configured as in the following examples, and here, among the following examples, those examples that may be utilized regardless of success or failure of LBT are not limited to be applied to the NR-U system and may be applicable to a licensed carrier.

(1) Example 1

The Start Time of the Window or Timer is Set from the First Symbol After at Least One Symbol from the Last Symbol of Pusch Occasion in Case Of Successful LBT Example 1 is a method that the window or timer for receiving Msg B is configured only when LBT is successful and Msg A PUSCH can be transmitted and that the window or timer for receiving Msg B is not configured when LBT fails and Msg A cannot be transmitted. That is, even if there is an Msg A PUSCH Occasion corresponding to the Msg A PRACH preamble transmitted by the UE, if the LBT fails, Msg A PUSCH transmission in the corresponding Msg A PUSCH Occasion is not performed, and thereby the window or timer for receiving Msg B does not start. Meanwhile, if the LBT is successful, Msg A PUSCH transmission in the corresponding Msg A PUSCH Occasion is normally performed, and the window or timer for receiving Msg B may also be started.

Here, a start time of the window or timer for receiving Msg B may be a symbol after at least one symbol from the last symbol of the Msg A PUSCH Occasion corresponding to the Msg A PRACH preamble transmitted by the UE. In other words, the window or timer for receiving Msg B may be configured to start with an interval of at least one symbol from Msg A PUSCH Occasion in symbol units. In addition, on the premise that a resource for monitoring Msg B is configured, the start time of the window or timer may be the first symbol of the resource for monitoring Msg B. Here, the resource for monitoring Msg B may be a resource corresponding to the earliest CORESET of the Type1-PDCCH Common Search Space set for the UE to receive the PDCCH for Msg B.

Therefore, in the case when the UE that has transmitted the Msg A PRACH preamble succeeds in LBT and then can transmit the Msg A PUSCH, the window or timer configured to receive the Msg B may start from the first symbol of the resource for monitoring the Msg B, and the corresponding start time may be a time point after at least one symbol from the last symbol of Msg A PUSCH Occasion.

Figure 27:
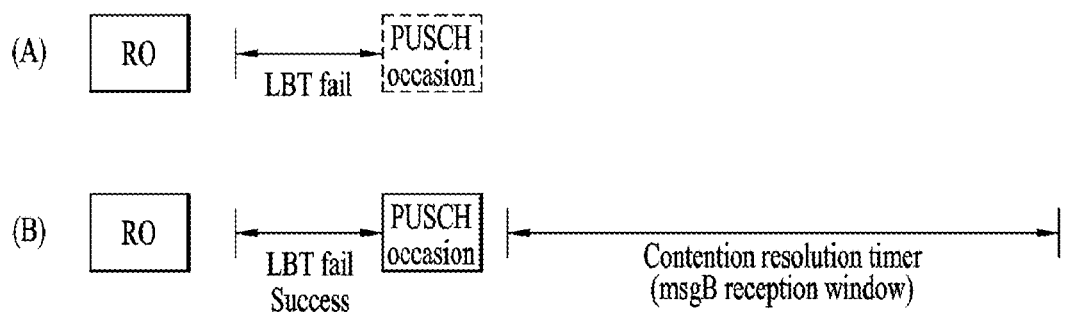
FIG. 27 is a diagram illustrating an example of configuring a reception window of Msg B according to success or failure of LBT for Msg A PUSCH transmission.

FIG. 27 is a diagram illustrating an example of configuring a reception window of Msg B depending on success or failure of LBT for Msg A PUSCH transmission. In FIG. 27(a), for a PO having a one-to-one correspondence with the RO related to the Msg A PRACH preamble transmitted by the UE, when LBT for Msg A PUSCH transmission fails, the UE does not transmit Msg A PUSCH and does not configure a window or timer for receiving Msg B. Meanwhile, in FIG. 27(b), for the PO having a one-to-one correspondence with the RO related to the Msg A PRACH preamble transmitted by the UE, when LBT for Msg A PUSCH transmission is successful, the UE transmits the Msg A PUSCH and configures a window or timer for receiving Msg B. Here, the window or timer configured for receiving Msg B starts from the first symbol of the resource for monitoring Msg B, and the corresponding start time is a time point after at least one symbol from the last symbol of PUSCH Occasion.

(2) Example 2

The Start Time of the Window or Timer is Set From the First Symbol After at Least One Symbol from the Last Symbol of PUSCH Occasion Regardless of LBT Success or Failure Example 2 is a method of setting a window or a timer for receiving Msg B even if the UE fails to transmit Msg A PUSCH because LBT for Msg A PUSCH fails, unlike Example 1. That is, if there is a PUSCH Occasion corresponding to the Msg A PRACH preamble transmitted by the UE, whether the LBT succeeds or fails, a reception window or timer for Msg B may be started, and the UE may expect to receive Msg B. The method of Example 2 may be applicable without distinction of a licensed carrier or an unlicensed carrier.

In the Example 2, a start time of the window or timer for receiving Msg B may be a symbol after at least one symbol from the last symbol of the Msg A PUSCH Occasion corresponding to the Msg A PRACH preamble transmitted by the UE. In other words, the window or timer for receiving Msg B may be configured to start with an interval of at least one symbol from Msg A PUSCH Occasion in symbol units. In addition, on the premise that a resource for monitoring Msg B is configured, the start time of the window or timer may be the first symbol of the resource for monitoring Msg B. Here, the resource for monitoring Msg B may be a resource corresponding to the earliest CORESET of the Type1-PDCCH Common Search Space set for the UE to receive the PDCCH for Msg B.

When the UE that has transmitted the Msg A PRACH preamble fails to transmit the Msg A PUSCH due to LBT failure, or does not transmit the Msg A PUSCH according to independent determination on the channel state, the UE may expect to receive a fallback RAR including uplink (UL) grant information for transmitting Msg 3 through Msg B. The base station also transmits a fallback RAR including UL grant information to the UE through Msg B, thereby inducing Msg 3 transmission of the UE along with fall-back to the 4-step RACH procedure. Here, even if the Random Access Preamble Index (RAPID) included in the detected Msg A PRACH preamble is the RAPID for the 2-step RACH procedure, and if the base station fails to decode the Msg A PUSCH for a certain period of time, the base station may assume that the UE has failed LBT and the Msg A PUSCH has not been transmitted, and a fallback RAR may be transmitted to the UE.

A UE expecting to receive a fallback RAR because it fails to transmit the Msg A PUSCH may ignore a success RAR including its own RAPID even if it detects the same, may expect to receive a fallback RAR whose RAPID matches its own RAPID during a given window or time duration of a timer. If the UE does not receive the RAR by the time of the expiration of the window or the timer, the UE may perform, up to a specified maximum number of transmissions, a random access resource selection procedure for random access after a certain back-off time, and then Radio Link Failure (RLF) procedures may be performed.

On the other hand, if the UE that has transmitted the Msg A PRACH preamble succeeds in LBT and transmits the Msg A PUSCH, the UE may expect to receive a success RAR including information on contention resolution through Msg B, and its RAPID and a specific value such as UE-specific identifier (UE-Identifier; UE-ID) may be expected to be included in the contents of Msg B. The base station may also inform that the 2-step RACH procedure of the UE may be successfully performed by transmitting a success RAR including information on contention resolution to the UE through Msg B. If the UE does not identify its RAPID and UE-ID through Msg B, the UE continues to perform blind decoding until the reception window or timer of Msg B expires. Here, if the UE fails to identify the RAPID and UE-ID by the time of expiration, the UE may perform the resource selection procedure for random access up to the specified maximum number of transmissions after a certain back-off time, and then the Radio Link Failure procedure may be performed.

The above examples may be similarly applied to a situation in which a plurality of UEs perform a 2-step RACH procedure with respect to one base station. In a situation where there are two UEs that have selected the Msg A PRACH preamble including the same RAPID at the same time, one UE transmits the Msg A PUSCH but the other UE fails to transmit the Msg A PUSCH may be occurred. Here, the UE transmitting the Msg A PUSCH expects to receive the success RAR as described above, and also expects that its RAPID and UE-ID are included in the contents of Msg B. If the UE does not identify its RAPID and UE-ID through Msg B, the UE continues to perform blind decoding by the time the window or timer expires, if the UE does not identify its RAPID and UE-ID until the expiration time, the UE may perform a resource selection procedure for a random access after a back-off time and a Radio Link Failure (RLF) procedure. On the other hand, the UE that fails to transmit the Msg A PUSCH expects a fallback RAR that matches its RAPID during the window or timer duration as described above, and even if it detects a success RAR including its own RAPID it may ignore the same. A UE that fails to receive the RAR by the time the window or timer expires may perform a resource selection procedure for random access after a certain back-off time and a Radio Link Failure procedure.

Figure 28:
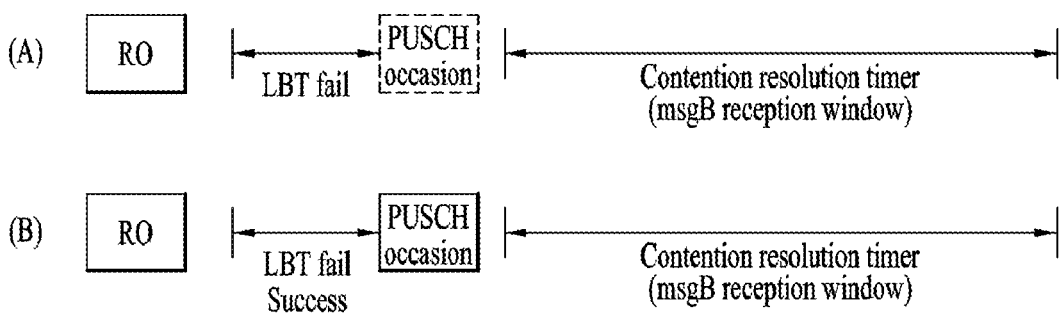
FIG. 28 is a diagram illustrating an example of configuring a reception window of Msg B regardless of success or failure of LBT for Msg A PUSCH transmission.

FIG. 28 is a diagram illustrating an example of configuring a reception window of Msg B regardless of success or failure of LBT for Msg A PUSCH transmission. In FIG. 28(a), for a PO in a one-to-one correspondence with the RO related to the Msg A PRACH preamble transmitted by the UE, even if the LBT for Msg A PUSCH transmission fails and the UE does not transmit the Msg A PUSCH, a window or timer for receiving Msg B may be configured. In addition, in FIG. 28(b), for the PO in a one-to-one correspondence with the RO related to the Msg A PRACH preamble transmitted by the UE, the UE transmits the Msg A PUSCH if the LBT for the Msg A PUSCH transmission is successful, and configures a window or timer for receiving Msg B. Here, the window or timer configured for receiving Msg B in FIG. 28(a) or 28(b) starts from the first symbol of a resource for monitoring Msg B, and the corresponding start time may be a time point after at least one symbol from the last symbol of PUSCH Occasion.

2. Case that RACH Occasion and Msg a PUSCH Occasions have a One-to-Multiple Mapping Relationship For Msg A transmission, a RACH Occasion (RO) in which the Msg A PRACH preamble is transmitted may be mapped with a plurality of PUSCH Occasions (POs) in which the Msg A PUSCH is transmitted. Here, the plurality of Msg A PUSCH Occasions may be continuously allocated without a time gap between Msg A PUSCH Occasions in the form of Time Division Multiplexing (TDM). Alternatively, the plurality of Msg A PUSCH Occasions may be allocated with a constant time gap.

The one to multiple mapping relationship between RACH Occasion and Msg A PUSCH Occasions may be configured according to various schemes. As a simple example, preambles for all 2-step RACH procedures may be mapped to all of a plurality of Msg A PUSCH Occasions, respectively.

Alternatively, as another example, preambles for the 2-step RACH procedure may be divided into N subsets, and the number of Msg A PUSCH Occasions mapped to the preamble may be configured differently for each subset. That is, with respect to preambles divided into N subsets, 1) in the case of a subset including preambles corresponding to #0 to #A-1, each preamble may be mapped to one Msg A PUSCH Occasion to form one to one mapping relationship, and 2) in the case of a subset including preambles corresponding to #A to #B-1, each preamble may be mapped to two Msg A PUSCH Occasions to form one to two mapping relationship, In addition to this, 3) in the case of a subset including the preambles corresponding to #B to #C-1, each preamble may be mapped to three Msg A PUSCH Occasions to form one to three mapping relationship, and further settings for mapping relationships are also possible.

In the above examples of configuring the number of Msg A PUSCH Occasions mapped to the preamble differently for each subset, the preambles included in the subset of 1) have a one-to-one mapping relationship with Msg A PUSCH Occasions, thus one PUSCH Occasion corresponding to the transmitted PRACH preamble is configured, whether to transmit Msg A PUSCH depending on success or failure of LBT is determined for the corresponding one PUSCH Occasion. The preambles included in the subset of 2) have a one to two mapping relationship with Msg A PUSCH Occasions, thus two PUSCH Occasions corresponding to the transmitted PRACH preamble are configured, whether to transmit Msg A PUSCH depending on success or failure of LBT is determined for the corresponding two PUSCH Occasions. Likewise, preambles included in the subset of 3) have a one to three mapping relationship with Msg A PUSCH Occasions, thus three PUSCH Occasions corresponding to the transmitted PRACH preamble are configured, whether to transmit Msg A PUSCH depending on success or failure of LBT is determined for the corresponding three PUSCH Occasions.

Since a plurality of LBT attempts may be made as resources of the number of PUSCH Occasions corresponding to the transmitted PRACH preamble increases, the probability of Msg A PUSCH transmission may be increased despite LBT failure. That is, the probability of Msg A PUSCH transmission may vary for each subset, and the UE may select a subset including preambles having a relatively high Msg A PUSCH transmission probability or a low Msg A PUSCH transmission probability, in consideration of a channel state or priority of a signal to be transmitted. For example, the UE may select a subset according to a reference signal received power (RSRP) for the reference signals such as a received Synchronization Signal Block (SSB) or a Channel State Information-Reference Signal (CSI-RS) or may select a subset according to a priority criterion such as the size of the Msg A PUSCH to be transmitted. Based on the selected subset, the UE may perform LBT for PUSCH Occasion(s) corresponding to the preamble included in the subset, attempt to transmit Msg A PUSCH, and configure a window or timer for receiving Msg B.

In this case, for the preambles having a one-to-one mapping relationship, Msg A PUSCH may be transmitted according to Example 1 or Example 2 described above, and a window or timer for receiving Msg B may be configured. In case that a plurality of PUSCH Occasions are mapped to one preamble, not a one-to-one mapping relationship, the possibility of collision of a plurality of Msg A PUSCHs by a plurality of PUSCH Occasions in the NR system should be considered. For example, in order to reduce the possibility of collision of a plurality of Msg A PUSCHs, among a plurality of Msg A PUSCH Occasions corresponding to the preamble, a modulo operation for the UE-ID based on the total number (M) of the plurality of Msg A PUSCH Occasions is applied and one Msg A PUSCH Occasion is determined, and Msg A PUSCH may be transmitted through the one Msg A PUSCH Occasion. Here, the modulo operation is (UE-ID)mod(M), and each preamble is sequentially mapped to a PUSCH Occasion according to the result value of (UE-ID)mod(M) based on the UE-ID included in each preamble, the UE may transmit the Msg A PUSCH based on the mapped Msg A PUSCH Occasion. In this case, a window or timer for receiving Msg B may be started after the mapped one PUSCH Occasion.

As another method of Msg A PUSCH transmission for a case in which a plurality of PUSCH occasions are mapped to one preamble, even if there is a possibility of collision of a plurality of Msg A PUSCHs, in order to increase the diversity and transmission probability of the Msg A PUSCH, the UE may transmit Msg A PUSCH in all Msg A PUSCH Occasions corresponding to the preamble. In this case, the UE attempts to transmit Msg A PUSCH in a plurality of PUSCH Occasions corresponding to the preamble, and LBT is performed on all of the plurality of PUSCH Occasions in the NR-U system. Therefore, it is necessary to configure which PUSCH Occasions will be a basis for starting a window or timer for receiving Msg B among a plurality of PUSCH Occasions, and therefor, the following examples may be utilized.

Here, likewise in Example 1 and Example 2, even though the UE succeeds in the LBT, or regardless of the success or failure of the LBT, in case that situation such as a deterioration in the channel status of said one PUSCH Occasion occur, the UE may predict the detection error probability for the Msg A PUSCH for itself and may transmit only the Msg A PRACH preamble and does not transmit the Msg A PUSCH. That is, among the following examples, those examples that may be utilized regardless of success or failure of LBT are not limited to be applied to the NR-U system and may be applicable to a licensed carrier.

(1) Example 3

A Window or Timer Start Time is Configured from the First Symbol after at Least One 1 Symbol from the Last Symbol of a PUSCH Occasion that has Succeeded in LBT Among a Plurality of PUSCH Occasions Example 3 is a method for the UE to perform LBT on each of a plurality of PUSCH Occasions, a window or timer for receiving Msg B is configured based on a PUSCH Occasion that has succeeded in LBT. Example 3 is the same as example 1 in that a window or timer for receiving Msg B is configured based on PUSCH Occasion that has succeeded in LBT. In case of example 3, when the UE fails the LBT for all of the plurality of PUSCH Occasions, a window or timer for receiving Msg B is not configured. That is, when the UE fails to transmit Msg A PUSCH, a window or timer for receiving Msg B does not start.

In Example 3, if LBT for a specific PUSCH Occasion succeeds, Msg A PUSCH transmission in the corresponding PUSCH Occasion is normally performed, and a window or timer for receiving Msg B may also be started. Here, the start time of the window or timer for receiving Msg B may be after at least one symbol from the last symbol of the PUSCH Occasion corresponding to the Msg A PRACH preamble transmitted by the UE. In other words, a window or timer for receiving Msg B may be configured to start with an interval of at least one symbol from PUSCH Occasion in symbol units. In addition, on the premise that a resource for monitoring Msg B is configured, the start time of the window or timer may be the first symbol of the resource for monitoring Msg B. Here, the resource for monitoring Msg B may be a resource corresponding to the earliest CORESET of the Type1-PDCCH Common Search Space set for the UE to receive the PDCCH for Msg B.

Therefore, in the case when the UE that has transmitted the Msg A PRACH preamble succeeds in LBT and then can transmit the Msg A PUSCH, the window or timer configured to receive the Msg B may start from the first symbol of the resource for monitoring the Msg B, and the corresponding start time may be a time point after at least one symbol from the last symbol of Msg A PUSCH Occasion.

Figure 29:
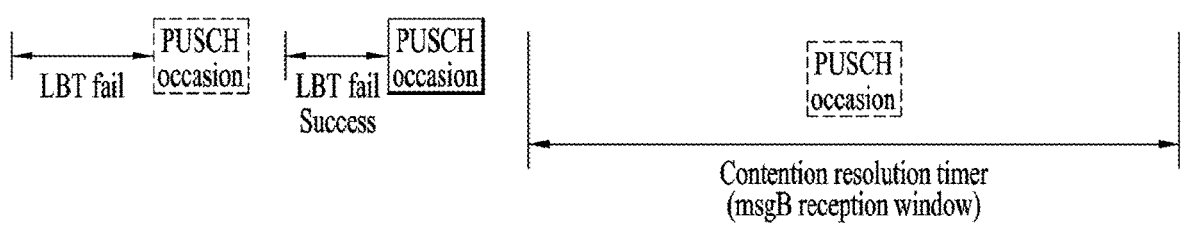
FIG. 29 is a diagram illustrating an example of configuring a reception window of Msg B according to a PUSCH Occasion that has succeeded in LBT among a plurality of PUSCH Occasions.

FIG. 29 is a diagram illustrating an example of configuring a window for receiving Msg B according to a PUSCH Occasion that has succeeded in LBT among a plurality of PUSCH Occasions. In FIG. 29, for a plurality of POs corresponding to the RO related to the Msg A PRACH preamble transmitted by the UE, when the LBT for a specific PO fails, the UE does not configure the window or timer for receiving Msg B based on the specific PO. Instead, the UE performs LBT until a PO in which LBT succeeds comes out, transmits Msg A PUSCH in the PO where LBT succeeds, and a window or timer for receiving Msg B may be configured at a time point after at least one symbol from the last symbol of the corresponding PO. Here, the POs shown in FIG. 29 correspond to one Msg A PRACH preamble in one to multiple scheme, and may be resources allocated redundantly in the form of TDM.

(2) Example 4

Regardless of LBT Success or Failure, the Start Time of a Window or Timer is Configured from the First Symbol after at Least One Symbol from the Last Symbol of the Last PUSCH Occasion Among a Plurality of PUSCH Occasions Example 4 is a method, for a plurality of PUSCH Occasions corresponding to the Msg A PRACH preamble, that a window or timer for receiving Msg B is always configured based on the last PUSCH Occasion among the plurality of PUSCH Occasions, regardless of success or failure of LBT for each PUSCH Occasion That is, in order to prepare for the failure of the LBT for all of the corresponding plurality of PUSCH Occasions and to expect the reception of the fallback RAR, a window or timer for receiving Msg B is always configured to start after at least one symbol from the last symbol of the last PUSCH Occasion among the plurality of TDMed PUSCH Occasions. The method of Example 4 is a method applicable without distinction of a licensed carrier or an unlicensed carrier, and operations of a UE and a base station related to Example 4 may be the same as those described in Example 2.

In Example 4, if LBT for a specific Msg A PUSCH Occasion succeeds, Msg A PUSCH transmission in the corresponding Msg A PUSCH Occasion is normally performed, and the reception window or timer of Msg B may also be started based on the Msg A PUSCH Occasion where LBT is successful. In this case, the UE transmitting the Msg A PUSCH may expect to receive a success RAR, and may expect to successfully complete the 2-step RACH procedure.

However, if the LBT continues to fail, for the last Msg A PUSCH Occasion, regardless of the LBT succeeds or fails, a window or a timer for receiving the Msg B is configured based on the last Msg A PUSCH Occasion. If the UE fails to transmit the Msg A PUSCH even in the last Msg A PUSCH Occasion, the UE may expect to receive a fallback RAR, and may expect to transmit Msg 3 by falling back to the 4-step RACH procedure.

In this case, the time point at which the window or timer for receiving Msg B starts may be after at least one symbol from the last symbol of the corresponding last Msg A PUSCH Occasion, as described above. In other words, a window or timer for receiving Msg B may be configured to start with an interval of at least one symbol from Msg A PUSCH Occasion in symbol units. In addition, on the premise that the resource for monitoring Msg B is configured, the start time of a window or timer may be the first symbol of a resource for monitoring Msg B. Here, the resource for monitoring Msg B may be a resource corresponding to the earliest CORESET of the Type1-PDCCH Common Search Space set for the UE to receive the PDCCH for Msg B.

Figure 30:
FIG. 30 is a diagram illustrating an example of configuring a reception window of Msg B according to the last PUSCH Occasion regardless of success or failure of LBT among a plurality of PUSCH Occasions.

FIG. 30 is a diagram illustrating an example of configuring a window for receiving Msg B according to the last Msg A PUSCH Occasion, regardless of success or failure of LBT among a plurality of Msg A PUSCH Occasions. In FIG. 30, even if the LBT fails for all of three POs corresponding to the RO related to the Msg A PRACH preamble transmitted by the UE, a window or timer for receiving Msg B may be configured based on the last PO. In particular, the UE may configure a window or timer for receiving Msg B at a time point after at least symbol from the last symbol of the corresponding last PO. Here, the POs shown in FIG. 30 correspond to one Msg A PRACH preamble in one to multiple scheme, and may be resources allocated redundantly in the form of TDM.

(3) Example 5

Regardless of LBT Success or Failure, the Start Time of a Window or Timer is Set after at Least One Symbol from the Last Symbol of the First Pusch Occasion Among a Plurality of Pusch Occasions In Example 5, for a plurality of Msg A PUSCH Occasions corresponding to the Msg A PRACH preamble, regardless of success or failure of LBT for each Msg A PUSCH Occasion, a window or a timer for receiving Msg B is always set based on the first Msg A PUSCH Occasion among the plurality of Msg A PUSCH Occasions. That is, a window or a timer start time for receiving Msg B is set after at least one symbol from the last symbol of the first Msg A PUSCH Occasion among a plurality of TDMed Msg A PUSCH Occasions. Here, the operation of the UE and the base station after the reception window or timer for Msg B based on the first Msg A PUSCH Occasion according to Example 5 is started may be the same as that described in Example 2, and at the same time, the UE may perform LBT for several remaining Msg A PUSCH Occasions thereafter.

The UE configures the window or timer for receiving Msg B after the first Msg A PUSCH Occasion and expects to receive Msg B, and at the same time performs LBT for subsequent Msg A PUSCH Occasions, so that, depending on which Msg A PUSCH Occasion the UE successfully transmits Msg A PUSCH, the reception time of Msg B may be before or after the transmission time of Msg A PUSCH. For example, if the UE succeeds in LBT for the first PUSCH Occasion and transmits the Msg A PUSCH through the first Msg A PUSCH Occasion, the reception time of the Msg B may be after the transmission time of the Msg A PUSCH. However, if the UE fails LBT for several Msg A PUSCH Occasions including the first Msg A PUSCH Occasion, and Msg A PUSCH is transmitted only in the Msg A PUSCH Occasion after the window or timer for Msg B reception expires, the reception time of Msg B is before the transmission time of the Msg A PUSCH.

Therefore, the subsequent operation of the UE performing LBT for a plurality of Msg A PUSCH Occasions may vary as follows depending whether the UE performing LBT finally succeeds in LBT but receives Msg B at a time before transmitting Msg A PUSCH, or whether Msg B is received at a time point after PUSCH transmission. Here, as described in Example 2, according to whether the UE has transmitted the Msg A PUSCH or the UE has not transmitted the Msg A PUSCH, a target object that each UE expect to receive, such as a success RAR or a fallback RAR signal, may be different. In addition, the problem of duplicate transmission for the success RAR or the fallback RAR may also be solved by applying a method similar to the method of the Example 2.

First, in case that the UE receives Msg B from the base station before transmitting the Msg A PUSCH, the base station receives the Msg A PRACH preamble and fails to receive the Msg A PUSCH, and therefore, the Msg B transmitted by the base station includes fallback RAR including containing information about a fallback and Msg 3 transmission. Here, if the configured Msg A PUSCH Occasions still exist, the UE stores the fallback RAR and performs LBT on the remaining Msg A PUSCH Occasions to expect transmission of the Msg A PUSCH. If the UE fails in LBT until the last Msg A PUSCH Occasion and cannot finally transmit Msg A PUSCH, the UE falls back to the 4-step RACH procedure using information included in the previously received fallback RAR and transmits Msg 3. Here, transmission information such as a grant for Msg 3 transmitted through the fallback RAR of Msg B may indicate subsequent resources in consideration of the fact that the base station initially allocates a plurality of Msg A PUSCH Occasions.

On the other hand, if the UE receives Msg B from the base station after succeeding in LBT and transmitting the Msg A PUSCH, the subsequent operation of the UE varies according to the contents of the Msg B transmitted by the base station. From the UE's point of view, since Msg A PUSCH has already been transmitted, if Msg B includes a fallback RAR, it may be ignored and reception of a success RAR may be expected. If the success RAR is not received during the reception window or the timer period of Msg B, the UE may fall back to the 4-step RACH procedure based on the previously received fallback RAR and transmit Msg 3. Alternatively, if a success RAR is not received during the reception window or the timer period of Msg B, the UE may perform a resource selection procedure for random access after a set back-off time in order to avoid a collision with the redundantly transmitted RAPID.

With respect to the examples described in the present disclosure, the UE may recognize an operation after the configured window or timer for receiving Msg B has expired as an operation according to the unsuccessful contention resolution. In this case, the UE may select a 2-step RACH procedure or a 4-step RACH procedure again according to a channel state after a preconfigured back-off time, and perform a resource selection procedure for random access.

Although not limited thereto, various descriptions, functions, procedures, proposals, methods, and/or operational flowcharts of the present disclosure disclosed in this document may be applied in various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 31:
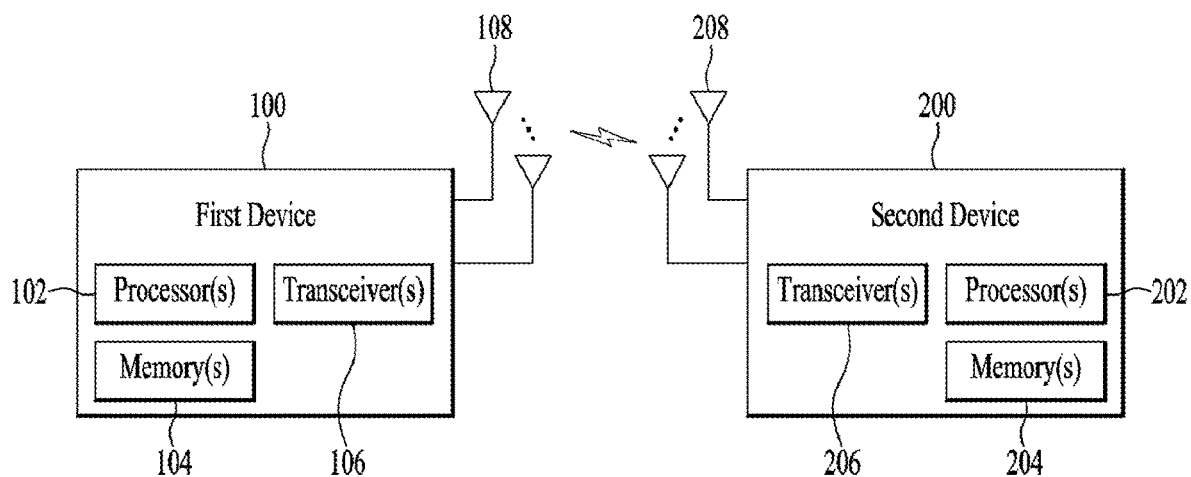
FIGS. 31 to 34 show examples of various wireless devices to which embodiments of the present disclosure are applied.

FIG. 31 illustrates wireless devices to which the present disclosure is applied.

Referring to FIG. 31, the first wireless device 100 and the second wireless device 200 may transmit/receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 2.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods, and/or operational flow charts disclosed herein. For example, the processor 102 may process information in the memory 104 to generate first information/signal, and then transmit a wireless signal including the first information/signal through the transceiver 106. In addition, the processor 102 may receive the radio signal including the second information/signal through the transceiver 106, and then store the information obtained from the signal processing of the second information/signal in the memory 104. The memory 104 may be connected to the processor 102 and may store various information related to the operation of the processor 102. For example, the memory 104 may store software code including instructions for performing some or all of processes controlled by the processor 102, or for performing the descriptions, functions, procedures, suggestions, methods, and/or operational flowcharts disclosed in the document. Here, the processor 102 and the memory 104 may be part of a communication modem/circuit/chip designed to implement a wireless communication technology (e.g., LTE, NR). A transceiver 106 may be coupled to the processor 102 and may transmit and/or receive wireless signals via one or more antennas 108. The transceiver 106 may include a transmitter and/or a receiver. The transceiver 106 may be used interchangeably with a radio frequency (RF) unit. In the present disclosure, a wireless device may refer to a communication modem/circuit/chip.

In detail, instructions and/or operations controlled by the processor 102 stored in the memory 104 of the first wireless device 100 according to an embodiment of the present disclosure and will be described.

The following operations are described based on the control operation of the processor 102 from the perspective of the processor 102, but may be stored in the memory 104, such as software code for performing these operations.

The processor 102 may control the transceiver 106 to transmit a first Physical Random Access Channel (PRACH) preamble through message A. And the processor 102 may control the transceiver 106 to receive a random access response (RAR) through message B related to contention resolution. In this case, a specific method for the processor 102 to control the transceiver 106 to transmit the message A and to control the transceiver 106 to receive the message B may be based on the above-described examples.

In detail, instructions and/or operations controlled by the processor 202 and stored in the memory 204 of the second wireless device 200 according to an embodiment of the present disclosure will be described.

The following operations are described based on the control operation of the processor 202 from the perspective of the processor 202, but may be stored in the memory 204, such as software code for performing these operations.

The processor 202 may control the transceiver 206 to receive the first Physical Random Access Channel (PRACH) preamble through message A. And the processor 202 may control the transceiver 206 to transmit a random access response (RAR) through message B related to contention resolution. In this case, a specific method for the processor 202 to control the transceiver 206 to receive the message A and to control the transceiver 206 to transmit the message B may be based on the above-described examples.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g., functional layers such as PHY, MAC, RLC, PDCP, RRC, SDAP). The one or more processors 102, 202 may generate one or more Protocol Data Units (PDUs) and/or one or more Service Data Units (SDUs) according to the description, function, procedure, proposal, method and/or operational flowcharts disclosed herein. One or more processors 102, 202 may generate messages, control information, data, or information according to the description, function, procedure, proposal, method, and/or flow charts disclosed herein. The one or more processors 102 and 202 generate a signal (e.g., a baseband signal) including PDUs, SDUs, messages, control information, data or information according to the functions, procedures, proposals and/or methods disclosed herein and provide it to one or more transceivers 106 and 206. One or more processors 102, 202 may receive signals (e.g., baseband signals) from one or more transceivers 106, 206, and may obtain PDUs, SDUs, messages, control information, data, or information according to description, functions, procedures, proposals, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202. The descriptions, functions, procedures, suggestions, methods, and/or flowcharts of operations disclosed in this document may be implemented using firmware or software, and the firmware or software may be implemented to include modules, procedures, functions, and the like. Firmware or software configured to perform the descriptions, functions, procedures, suggestions, methods, and/or flow charts disclosed herein may be included in one or more processors 102, 202 or may be stored in one or more memories 104, 204 and driven by one or more processors 102, 202. The descriptions, functions, procedures, suggestions, methods, and/or flowcharts of operations disclosed herein may be implemented using firmware or software in the form of code, instructions, and/or a set of instructions.

One or more memories 104, 204 may be coupled to one or more processors 102, 202 and may store various forms of data, signals, messages, information, programs, codes, instructions, and/or instructions. One or more memories 104, 204 may be comprised of ROM, RAM, EPROM, flash memory, hard drives, registers, cache memory, computer readable storage media, and/or combinations thereof. One or more memories 104, 204 may be located inside and/or external to one or more processors 102, 202. Additionally, one or more memories 104, 204 may be coupled to one or more processors 102, 202 through various technologies, such as wired or wireless connections.

One or more transceivers 106, 206 may transmit user data, control information, radio signals/channels, etc. referred to in the methods and/or operation flowcharts herein, to one or more other devices. The one or more transceivers 106, 206 may receive user data, control information, radio signals/channels, etc. referred to in the descriptions, functions, procedures, suggestions, methods and/or flow charts, etc. disclosed herein, from one or more other devices. For example, one or more transceivers 106, 206 may be coupled to one or more processors 102, 202 and may transmit and receive wireless signals. For example, one or more processors 102, 202 may control one or more transceivers 106, 206 to transmit user data, control information, or wireless signals to one or more other devices. In addition, one or more processors 102, 202 may control one or more transceivers 106, 206 to receive user data, control information, or wireless signals from one or more other devices. Further, one or more transceivers 106, 206 may be coupled to one or more antennas 108, 208, and may be configured to transmit and receive, through the one or more antennas 108, 208, user data, control information, radio signals/channels, etc. mentioned in description, functions, procedures, proposals, methods and/or operation flowcharts. In this document, one or more antennas may be a plurality of physical antennas or a plurality of logical antennas (e.g., antenna ports). The one or more transceivers 106, 206 convert the received radio signal/channel, etc. from the RF band signal into a baseband signal to process the received user data, control information, radio signal/channel, etc. using the one or more processors 102, 202. One or more transceivers 106 and 206 may convert user data, control information, radio signals/channels, etc. processed using one or more processors 102 and 202 from baseband signals to RF band signals. To this end, one or more transceivers 106, 206 may include (analog) oscillators and/or filters.

Figure 32:
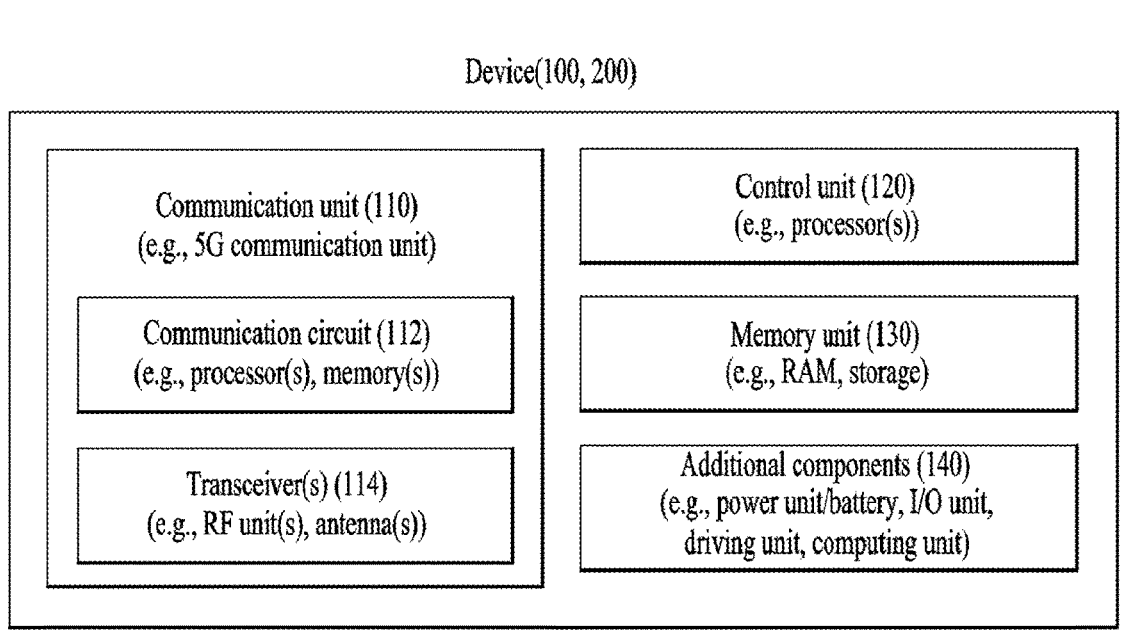

FIG. 32 shows another example of a wireless device applied to the present disclosure. The wireless device may be implemented in various forms according to use-examples/services (refer to FIG. 31).

Referring to FIG. 32, wireless devices 100 and 200 may correspond to wireless devices 100 and 200 of FIG. 31, and may consist of various elements, components, units/units, and/or modules. For example, the wireless devices 100 and 200 may include a communication unit 110, a control unit 120, a memory unit 130, and an additional element 140. The communication unit may include communication circuitry 112 and transceiver(s) 114. For example, communication circuitry 112 may include one or more processors 102, 202 and/or one or more memories 104, 204 of FIG. 31. For example, the transceiver(s) 114 may include one or more transceivers 106, 206 and/or one or more antennas 108, 208 of FIG. 31. The control unit 120 is electrically connected to the communication unit 110, the memory unit 130, and the additional element 140, and controls general operations of the wireless device. For example, the controller 120 may control the electrical/mechanical operation of the wireless device based on the program/code/command/information stored in the memory unit 130. In addition, the control unit 120 may transmit the information stored in the memory unit 130 to the outside (e.g., another communication device) through the communication unit 110 through a wireless/wired interface, or may store information received from the outside (e.g., another communication device) through a wireless/wired interface through the communication unit 110 in the memory unit 130. Accordingly, the specific operation process of the control unit 120 and the program/code/instruction/information stored in the memory unit 130 according to the present disclosure may correspond to operations of at least one of the processors 102 and 202 and operations of at least one of the memories 104 and 204 of FIG. 31.

The additional element 140 may be variously configured according to the type of the wireless device. For example, the additional element 140 may include at least one of a power unit/battery, an input/output unit (I/O unit), a driving unit, and a computing unit. Although not limited thereto, a wireless device may include a robot (FIGS. 2 and 100a), a vehicle (FIG. 2, 100b-1, 100b-2), an XR device (FIGS. 2 and 100c), a mobile device (FIGS. 2 and 100d), a home appliance (FIG. 2, 100e), IoT device (FIG. 2, 100f), digital broadcasting terminal, hologram device, public safety device, MTC device, medical device, fintech device (or financial device), security device, climate/environment device, It may be implemented in the form of an AI server/device (FIGS. 2 and 400), a base station (FIGS. 2 and 200), and a network node. The wireless device may be mobile or used in a fixed location depending on the use-example/service.

In FIG. 32, various elements, components, units/units, and/or modules in the wireless devices 100 and 200 may be all interconnected through a wired interface, or at least some of them may be wirelessly connected through the communication unit 110. For example, in the wireless devices 100 and 200, the control unit 120 and the communication unit 110 are connected by wire, and the control unit 120 and the first unit (e.g., 130, 140) may be connected to the communication unit 110 wirelessly through the communication unit 110. In addition, each element, component, unit/unit, and/or module within the wireless device 100, 200 may further include one or more elements. For example, the controller 120 may be configured with one or more processor sets. For example, the control unit 120 may be configured as a set of a communication control processor, an application processor, an electronic control unit (ECU), a graphic processing processor, a memory control processor, and the like. As another example, the memory unit 130 may include random access memory (RAM), dynamic RAM (DRAM), read only memory (ROM), flash memory, volatile memory, and non-volatile memory. volatile memory) and/or a combination thereof.

Hereinafter, the implementation examples of FIG. 32 will be described in more detail with reference to the drawings.

Figure 33:
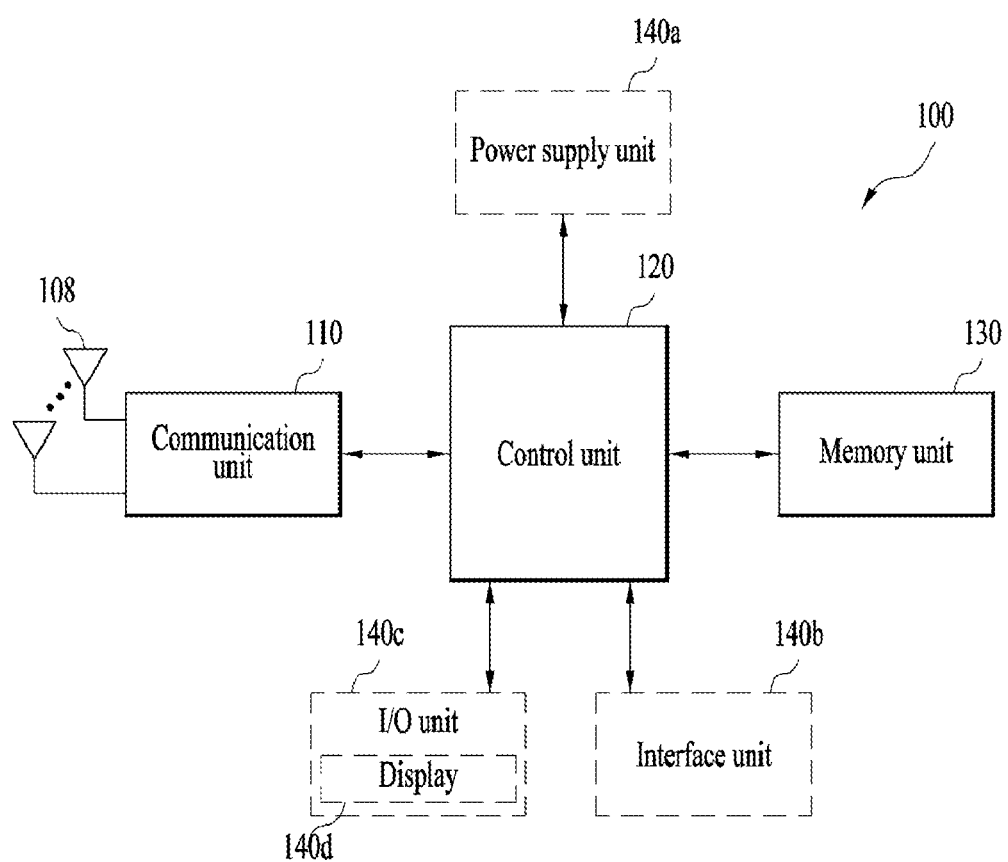

FIG. 33 illustrates a portable device to which the present disclosure is applied. The portable device may include a smart phone, a smart pad, a wearable device (e.g., a smart watch, smart glasses), and a portable computer (e.g., a laptop computer). A mobile device may be referred to as a mobile station (MS), a user terminal (UT), a mobile subscriber station (MSS), a subscriber station (SS), an advanced mobile station (AMS), or a wireless terminal (WT).

Referring to FIG. 33, the portable device 100 includes an antenna unit 108, a communication unit 110, a control unit 120, a memory unit 130, a power supply unit 140a, an interface unit 140b, and input/output. It may include a part 140c. The antenna unit 108 may be configured as a part of the communication unit 110. Blocks 110 to 130/140a to 140c respectively correspond to blocks 110 to 130/140 of FIG. 32.

The communication unit 110 may transmit and receive signals (e.g., data, control signals, etc.) with other wireless devices and base stations. The controller 120 may perform various operations by controlling the components of the portable device 100. The controller 120 may include an application processor (AP). The memory unit 130 may store data/parameters/programs/codes/commands necessary for driving the portable device 100. Also, the memory unit 130 may store input/output data/information. The power supply unit 140a supplies power to the portable device 100 and may include a wired/wireless charging circuit, a battery, and the like. The interface unit 140b may support a connection between the portable device 100 and other external devices. The interface unit 140b may include various ports (e.g., an audio input/output port and a video input/output port) for connection with an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c obtains information/signals (e.g., touch, text, voice, image, video) inputted from the user, and the obtained information/signal may be stored in a memory unit (130). The communication unit 110 may convert the information/signal stored in the memory into a wireless signal, and transmit the converted wireless signal directly to another wireless device or to a base station. Also, after receiving a radio signal from another radio device or base station, the communication unit 110 may restore the received radio signal to original information/signal. After the restored information/signal is stored in the memory unit 130, it may be output in various forms (e.g., text, voice, image, video, haptic) through the input/output unit 140c.

Figure 34:
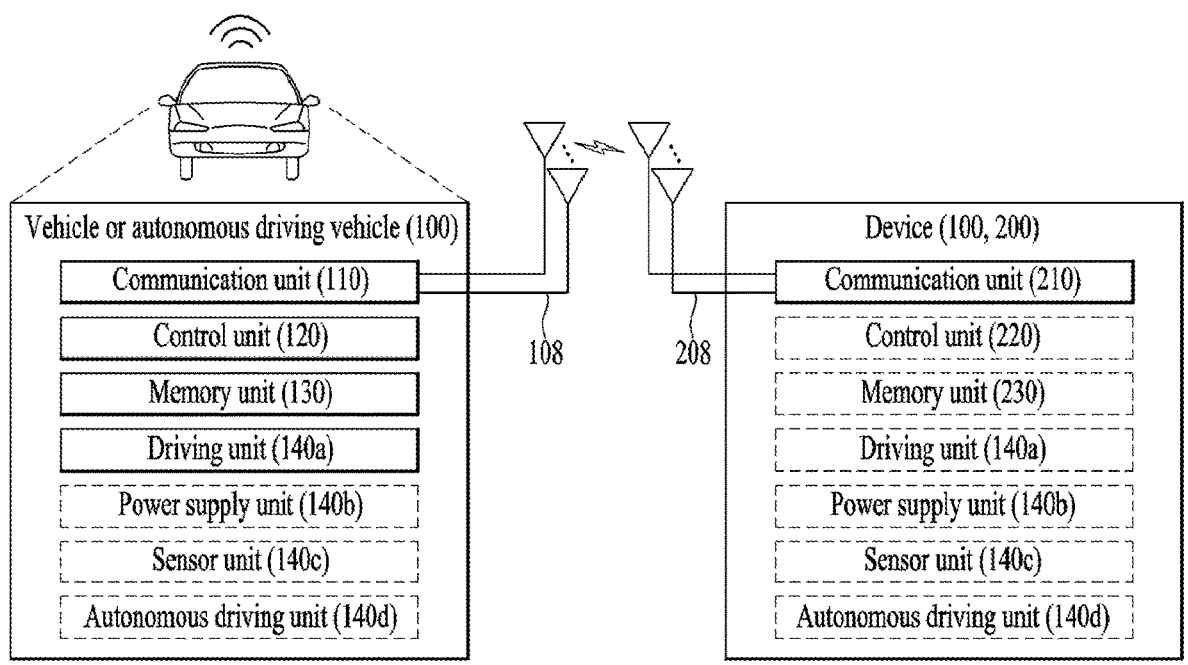

FIG. 34 exemplifies a vehicle or an autonomous driving vehicle to which the present disclosure is applied. The vehicle or autonomous driving vehicle may be implemented as a mobile robot, a vehicle, a train, an aerial vehicle (AV), a ship, and the like.

Referring to FIG. 34, the vehicle or autonomous vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. Blocks 110/130/140a-140d correspond to blocks 110/130/140 of FIG. 32, respectively.

The communication unit 110 may transmit and receive signals (e.g., data, control signals, etc.) with external devices such as other vehicles, base stations (e.g., base stations, roadside base stations, etc.), servers, and the like. The controller 120 may control elements of the vehicle or the autonomous driving vehicle 100 to perform various operations. The controller 120 may include an Electronic Control Unit (ECU). The driving unit 140a may cause the vehicle or the autonomous driving vehicle 100 to run on the ground. The driving unit 140a may include an engine, a motor, a power train, a wheel, a brake, a steering device, and the like. The power supply unit 140b supplies power to the vehicle or the autonomous driving vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight sensor, a heading sensor, a position module, and a vehicle forward movement/reverse movement sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed such as adaptive cruise control, a technology for automatically driving along a predetermined route, and a technology for automatically setting a route when a destination is set.

As an example, the communication unit 110 may receive map data, traffic information data, and the like from an external server. The autonomous driving unit 140d may generate an autonomous driving route and a driving plan based on the acquired data. The controller 120 may control the driving unit 140a to move the vehicle or the autonomous driving vehicle 100 along the autonomous driving path (e.g., speed/direction adjustment) according to the driving plan. During autonomous driving, the communication unit 110 may obtain the latest traffic information data from an external server non/periodically, and may acquire surrounding traffic information data from surrounding vehicles. Also, during autonomous driving, the sensor unit 140c may acquire vehicle state and surrounding environment information. The autonomous driving unit 140d may update the autonomous driving route and driving plan based on the newly acquired data/information. The communication unit 110 may transmit information about a vehicle location, an autonomous driving route, a driving plan, and the like to an external server. The external server may predict traffic information data in advance using AI technology or the like based on information collected from the vehicle or autonomous driving vehicles, and may provide the predicted traffic information data to the vehicle or autonomous driving vehicles.

Figure 35:
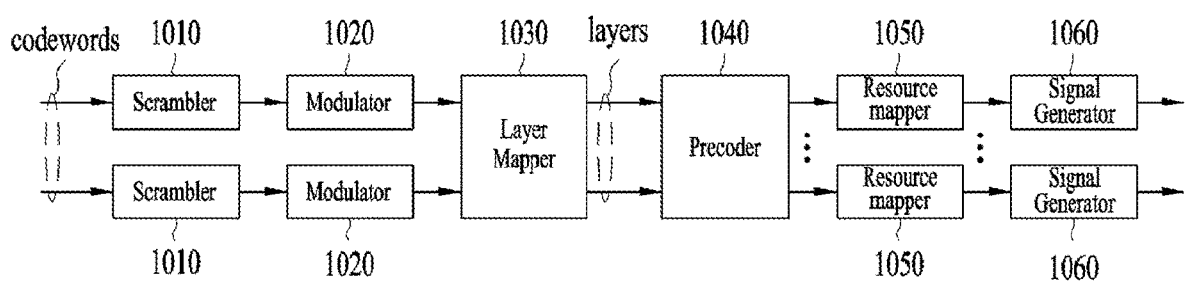
FIG. 35 shows an example of a signal processing circuit to which embodiments of the present disclosure are applied.

FIG. 35 illustrates a signal processing circuit for a transmit signal.

Referring to FIG. 35, the signal processing circuit 1000 may include a scrambler 1010, a modulator 1020, a layer mapper 1030, a precoder 1040, a resource mapper 1050, and a signal generator 1060. Although not limited, the operations/functions of FIG. 35 may be performed by the processors 102 and 202 and/or the transceivers 106 and 206 of FIG. 31. The hardware elements of FIG. 35 may be implemented in the processors 102, 202 and/or transceivers 106, 206 of FIG. 31. For example, blocks 1010 to 1060 may be implemented in the processors 102 and 202 of FIG. 31. Further, blocks 1010 to 1050 may be implemented in the processors 102 and 202 of FIG. 31, and block 1060 may be implemented in the transceivers 106 and 206 of FIG. 31.

The codeword may be converted into a wireless signal through the signal processing circuit 1000 of FIG. 35. Here, the codeword is a coded bit sequence of an information block. The information block may include a transport block (e.g., a UL-SCH transport block, a DL-SCH transport block). The radio signal may be transmitted through various physical channels (e.g., PUSCH, PDSCH).

Specifically, the codeword may be converted into a scrambled bit sequence by the scrambler 1010. A scramble sequence used for scrambling is generated based on an initialization value, and the initialization value may include ID information of a wireless device, and the like. The scrambled bit sequence may be modulated by a modulator 1020 into a modulation symbol sequence. The modulation method may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. Modulation symbols of each transport layer may be mapped to corresponding antenna port(s) by the precoder 1040 (precoding). The output z of the precoder 1040 may be obtained by multiplying the output y of the layer mapper 1030 by the precoding matrix W of N*M. Here, N is the number of antenna ports, and M is the number of transport layers. Here, the precoder 1040 may perform precoding after performing transform precoding (e.g., DFT transform) on the complex modulation symbols. Also, the precoder 1040 may perform precoding without performing transform precoding.

The resource mapper 1050 may map the modulation symbols of each antenna port to a time-frequency resource. The time-frequency resource may include a plurality of symbols (e.g., a CP-OFDMA symbol, a DFT-s-OFDMA symbol) in the time domain and a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module and a Cyclic Prefix (CP) inserter, a Digital-to-Analog Converter (DAC), a frequency uplink converter, and the like.

A signal processing process for a received signal in the wireless device may be configured in reverse of the signal processing process 1010 to 1060 of FIG. 35. For example, the wireless device (e.g., 100 and 200 in FIG. 31) may receive a wireless signal from the outside through an antenna port/transceiver. The received radio signal may be converted into a baseband signal through a signal restorer. To this end, the signal restorer may include a frequency downlink converter, an analog-to-digital converter (ADC), a CP remover, and a Fast Fourier Transform (FFT) module. Thereafter, the baseband signal may be restored to a codeword through a resource de-mapper process, a postcoding process, a demodulation process, and a descrambling process. The codeword may be restored to the original information block through decoding. Accordingly, the signal processing circuit (not shown) for the received signal may include a signal restorer, a resource de-mapper, a post coder, a demodulator, a descrambler, and a decoder.

The examples described above are those in which elements and features of the present disclosure are combined in a predetermined form. Each component or feature should be considered optional unless explicitly stated otherwise. Each component or feature may be implemented in a form that is not combined with other components or features. In addition, it is also possible to configure an example of the present disclosure by combining some elements and/or features. The order of operations described in the examples of the present disclosure may be changed. Some configurations or features of one embodiment example may be included in other example, or may be replaced with corresponding configurations or features of other example. It is clear that claims that are not explicitly cited in the claims may be combined to form an example or included as a new claim by amendment after filing.

A specific operation described to be performed by a base station in the present disclosure may be performed by an upper node thereof in some cases. That is, it is clear that various operations performed for communication with the terminal in a network including a plurality of network nodes including the base station may be performed by the base station or other network nodes other than the base station. The base station may be replaced by terms such as a fixed station, gNode B (gNB), Node B, eNode B (eNB), an access point, etc.

It is apparent to those skilled in the art that the present disclosure can be embodied in other specific forms without departing from the characteristics of the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

INDUSTRIAL AVAILABILITY

A method for transmitting and receiving a signal for a terminal to perform a random access process in the unlicensed band as described above and an apparatus for the same have been mainly described with examples applied to the 5th generation NewRAT system, but may be applied to various wireless communication systems other than the 5th generation NewRAT system.

The invention claimed is:

1. A method comprising:
receiving, by a terminal, a synchronization signal/physical broadcast channel (SS/PBCH) block from a base station;
obtaining, by the terminal, system information from the PBCH included in the SS/PBCH block;
transmitting, by the terminal to the base station, a message A, based on the system information; and
receiving, by the terminal, a random access response (RAR) in a message B during a window;
wherein, based on a physical random access channel (PRACH) preamble being mapped to a valid physical uplink shared channel (PUSCH) occasion, for both of i) a transmission of a PRACH and a PUSCH and ii) a transmission of only a PRACH without a PUSCH, the window for detecting the message B starts at least one symbol after a last symbol of a PUSCH occasion corresponding to the PRACH preamble.

2. The method of claim 1, wherein:
for the transmission of the PRACH and the PUSCH, the RAR is a success RAR including information on contention resolution.

3. The method of claim 1,
wherein the window starts at a first symbol of a resource related to monitoring of the message B.

4. The method of claim 1, wherein:
for the transmission of only the PRACH, the RAR is a fallback RAR including uplink (UL) grant information.

5. A device comprising:
at least one processor; and
at least one memory operably connected to the at least one processor, and storing instructions that, based on being executed by the at least one processor, perform specific operations,
wherein the specific operations comprise:
receiving a synchronization signal/physical broadcast channel (SS/PBCH) block;
obtaining system information from the PBCH included in the SS/PBCH block;
transmitting a message A, based on the system information; and
receiving a random access response (RAR) a message B during a window;
wherein, based on a physical random access channel (PRACH) preamble being mapped to a valid physical uplink shared channel (PUSCH) occasion, for both of i) a transmission of a PRACH and a PUSCH and ii) a transmission of only a PRACH without a PUSCH, the window for detecting the message B starts at least one symbol after a last symbol of a PUSCH occasion corresponding to the PRACH preamble.

6. The device of claim 5, wherein:
for the transmission of the PRACH and the PUSCH, the RAR is a success RAR including information on contention resolution.

7. The device of claim 5,
wherein the window starts at a first symbol of a resource related to monitoring of the message B.

8. The device of claim 5, wherein:
for the transmission of only the PRACH, the RAR is a fallback RAR including uplink (UL) grant information.

9. A terminal comprising:
at least one transceiver;
at least one processor; and
at least one memory operably connected to the at least one processor, and storing instructions that, based on being executed by the at least one processor, perform specific operations,
wherein the specific operations comprise:
receiving a synchronization signal/physical broadcast channel (SS/PBCH) block from a base station;
obtaining system information from the PBCH included in the SS/PBCH block;
transmitting a message A to the base station, based on the system information; and
receiving a random access response (RAR) in a message B during a window;
wherein, based on a physical random access channel (PRACH) preamble being mapped to a valid physical uplink shared channel (PUSCH) occasion, for both of i) a transmission of a PRACH and a PUSCH and ii) a transmission of only a PRACH without a PUSCH, the window for detecting the message B starts at least one symbol after a last symbol of a PUSCH occasion corresponding to the PRACH preamble.

* * * * *